(12) United States Patent
Banerjee et al.

(10) Patent No.: US 12,245,036 B1
(45) Date of Patent: Mar. 4, 2025

(54) GLOBAL SECURE SIM CLIENTLESS SASE ARCHITECTURE FOR CELLULAR DEVICES

(71) Applicant: Netskope, Inc., Santa Clara, CA (US)

(72) Inventors: Kallol Banerjee, San Jose, CA (US); Jonathan Bosanac, Ennis, MT (US); Milind Gunjan, Olathe, KS (US)

(73) Assignee: Netskope, Inc., Santa Clara, CA (US)

( * ) Notice: Subject to any disclaimer, the term of this patent is extended or adjusted under 35 U.S.C. 154(b) by 0 days.

(21) Appl. No.: 18/769,302

(22) Filed: Jul. 10, 2024

(51) Int. Cl.
*H04W 12/088* (2021.01)
*H04W 8/20* (2009.01)
*H04W 12/72* (2021.01)

(52) U.S. Cl.
CPC ........... *H04W 12/088* (2021.01); *H04W 8/20* (2013.01); *H04W 12/72* (2021.01)

(58) Field of Classification Search
CPC ...... H04W 12/088; H04W 8/20; H04W 12/72
See application file for complete search history.

(56) References Cited

U.S. PATENT DOCUMENTS

| | | | |
|---|---|---|---|
| 5,440,723 A | 8/1995 | Arnold et al. | |
| 6,513,122 B1 | 1/2003 | Magdych et al. | |
| 6,622,248 B1 | 9/2003 | Hirai | |
| 7,080,408 B1 | 7/2006 | Pak et al. | |
| 7,298,864 B2 | 11/2007 | Jones | |
| 7,376,719 B1 | 5/2008 | Shafer et al. | |
| 7,546,629 B2 | 6/2009 | Albert et al. | |
| 7,735,116 B1 | 6/2010 | Gauvin | |
| 7,822,972 B2 | 10/2010 | Lillie et al. | |

(Continued)

FOREIGN PATENT DOCUMENTS

| | | | | |
|---|---|---|---|---|
| CN | 108076450 B | * | 1/2022 | ............ H04W 8/005 |
| EP | 1063833 A2 | | 12/2000 | |

(Continued)

OTHER PUBLICATIONS

Martin, Victoria "Cooperative Security Fabric," The Fortinet Cookbook, Jun. 8, 2016, 6 pgs., archived Jul. 28, 2016 at https://web.archive.org/web/20160728170025/http://cookbook.fortinet.com/cooperative-security-fabric-54.

(Continued)

*Primary Examiner* — Christopher A Revak
(74) *Attorney, Agent, or Firm* — MUGHAL GAUDRY & FRANKLIN PC

(57) ABSTRACT

A clientless security system to secure cellular devices across a network in a cloud-based environment. The clientless security system includes a tenant with multiple cellular devices, tunnels for transmitting traffic, and a traffic steering module for directing traffic toward a gateway. The clientless security system further includes gateways to apply policies based on a device profile and an alert generator. The traffic steering module provides a SIM with network identifiers, configures the SIM with a custom network identifier, creates a device-to-IP mapping, and distributes the device-to-IP mapping to gateways in real-time. The gateways apply multiple policies based on a device profile, receive traffic from the traffic steering module, and perform a reverse lookup. The gateways further determine a device identity, apply policies, and forward traffic to a destination. The alert generator is also used to notify the tenant of further remediation in case of policy violations.

20 Claims, 12 Drawing Sheets

(56) References Cited

U.S. PATENT DOCUMENTS

| | | | |
|---|---|---|---|
| 7,966,654 | B2 | 6/2011 | Crawford |
| 8,000,329 | B2 | 8/2011 | Fendick et al. |
| 8,296,178 | B2 | 10/2012 | Hudis et al. |
| 8,793,151 | B2 | 7/2014 | DelZoppo et al. |
| 8,839,417 | B1 | 9/2014 | Jordan |
| 9,197,601 | B2 | 11/2015 | Pasdar |
| 9,225,734 | B1 | 12/2015 | Hastings |
| 9,231,968 | B2 | 1/2016 | Fang et al. |
| 9,280,678 | B2 | 3/2016 | Redberg |
| 9,811,662 | B2 | 11/2017 | Sharpe et al. |
| 9,949,130 | B2 | 4/2018 | Ophir et al. |
| 10,084,825 | B1 | 9/2018 | Xu |
| 10,178,133 | B2 | 1/2019 | Mattes et al. |
| 10,200,412 | B2 | 2/2019 | Jacobsen et al. |
| 10,237,282 | B2 | 3/2019 | Nelson et al. |
| 10,334,442 | B2 | 6/2019 | Vaughn et al. |
| 10,382,468 | B2 | 8/2019 | Dods |
| 10,484,334 | B1 | 11/2019 | Lee et al. |
| 10,812,532 | B2 | 10/2020 | Verma et al. |
| 10,826,941 | B2 | 11/2020 | Jain et al. |
| 11,032,301 | B2 | 6/2021 | Mandrychenko et al. |
| 11,036,856 | B2 | 6/2021 | Graun et al. |
| 11,039,299 | B2* | 6/2021 | Gui ............... H04W 4/50 |
| 11,281,775 | B2 | 3/2022 | Burdett et al. |
| 12,120,022 | B1* | 10/2024 | Thomas ............... H04L 45/745 |
| 2002/0099666 | A1 | 7/2002 | Dryer et al. |
| 2003/0055994 | A1 | 3/2003 | Herrmann et al. |
| 2003/0063321 | A1 | 4/2003 | Inoue et al. |
| 2003/0172292 | A1 | 9/2003 | Judge |
| 2003/0204632 | A1 | 10/2003 | Willebeek-Lemair et al. |
| 2004/0015719 | A1 | 1/2004 | Lee et al. |
| 2005/0010593 | A1 | 1/2005 | Fellenstein et al. |
| 2005/0271246 | A1 | 12/2005 | Sharma et al. |
| 2006/0075075 | A1 | 4/2006 | Malinen et al. |
| 2006/0156401 | A1 | 7/2006 | Newstadt et al. |
| 2007/0055752 | A1 | 3/2007 | Wiegand et al. |
| 2007/0204018 | A1 | 8/2007 | Chandra et al. |
| 2007/0237147 | A1 | 10/2007 | Quinn et al. |
| 2008/0069480 | A1 | 3/2008 | Aarabi et al. |
| 2008/0134332 | A1 | 6/2008 | Keohane et al. |
| 2009/0144818 | A1 | 6/2009 | Kumar et al. |
| 2009/0249470 | A1 | 10/2009 | Litvin et al. |
| 2009/0300351 | A1 | 12/2009 | Lei et al. |
| 2010/0017436 | A1 | 1/2010 | Wolge |
| 2011/0119481 | A1 | 5/2011 | Auradkar et al. |
| 2011/0145594 | A1 | 6/2011 | Jho et al. |
| 2012/0278896 | A1 | 11/2012 | Fang et al. |
| 2013/0007837 | A1 | 1/2013 | King |
| 2013/0159694 | A1 | 6/2013 | Chiueh et al. |
| 2013/0239171 | A1 | 9/2013 | Ramesh et al. |
| 2013/0298190 | A1 | 11/2013 | Sikka et al. |
| 2013/0318346 | A1* | 11/2013 | Libonate ............... H04L 43/16 713/168 |
| 2013/0347085 | A1 | 12/2013 | Hawthorn et al. |
| 2014/0013112 | A1 | 1/2014 | Cidon et al. |
| 2014/0068030 | A1 | 3/2014 | Chambers et al. |
| 2014/0068705 | A1 | 3/2014 | Chambers et al. |
| 2014/0259093 | A1 | 9/2014 | Narayanaswamy et al. |
| 2014/0282843 | A1 | 9/2014 | Buruganahalli et al. |
| 2014/0359282 | A1 | 12/2014 | Shikfa et al. |
| 2014/0366079 | A1 | 12/2014 | Pasdar |
| 2015/0099559 | A1* | 4/2015 | Bendixen ............... H04W 4/20 455/552.1 |
| 2015/0100357 | A1 | 4/2015 | Seese et al. |
| 2015/0237500 | A1 | 8/2015 | Muddassir |
| 2015/0350878 | A1* | 12/2015 | Li ............... H04W 8/183 455/558 |
| 2016/0234205 | A1 | 8/2016 | An et al. |
| 2016/0323318 | A1 | 11/2016 | Terrill et al. |
| 2016/0350145 | A1 | 12/2016 | Botzer et al. |
| 2017/0033984 | A1* | 2/2017 | Lear ............... H04L 67/34 |
| 2017/0064005 | A1 | 3/2017 | Lee |
| 2017/0093917 | A1 | 3/2017 | Chandra et al. |
| 2017/0250951 | A1 | 8/2017 | Wang et al. |
| 2019/0069122 | A1* | 2/2019 | Karimli ............... H04M 17/02 |
| 2020/0050686 | A1 | 2/2020 | Kamalapuram et al. |
| 2020/0314107 | A1 | 10/2020 | Joshi et al. |
| 2021/0014686 | A1 | 1/2021 | Hu et al. |
| 2021/0092596 | A1 | 3/2021 | Kudtarkar et al. |
| 2021/0105617 | A1 | 4/2021 | Mo |
| 2021/0211862 | A1* | 7/2021 | Chen ............... H04W 8/183 |
| 2021/0243083 | A1 | 8/2021 | Martini et al. |
| 2022/0210656 | A1 | 6/2022 | Shaw et al. |
| 2022/0329615 | A1 | 10/2022 | Kim et al. |
| 2023/0328063 | A1 | 10/2023 | Li et al. |
| 2024/0107294 | A1* | 3/2024 | Silverlock ............... H04W 8/26 |
| 2024/0205810 | A1* | 6/2024 | Majjiga ............... H04W 48/18 |

FOREIGN PATENT DOCUMENTS

| | | | | |
|---|---|---|---|---|
| GB | 2594827 | A * | 11/2021 | ......... H04L 12/2898 |
| WO | WO-2022035696 | A1 * | 2/2022 | ......... H04L 63/0421 |

OTHER PUBLICATIONS

Huckaby, Jeff Ending Clear Text Protocols, Rackaid.com, Dec. 9, 2008, 3 pgs.

Newton, Harry "fabric," Newton's Telecom Dictionary, 30th Updated, Expanded, Anniversary Edition, 2016, 3 pgs.

Fortinet, "Fortinet Security Fabric Earns 100% Detection Scores Across Several Attack Vectors in NSS Labs' Latest Breach Detection Group Test [press release]", Aug. 2, 2016, 4 pgs, available at https://www.fortinet.com/de/corporate/about-us/newsroom/press-releases/2016/security-fabric-earns-100-percent-breach-detection-scores-nss-labs.

Fortinet, "Fortinet Security Fabric Named 2016 CRN Network Security Product of the Year [press release]", Dec. 5, 2016, 4 pgs, available at https://www.fortinet.com/corporate/about-us/newsroom/press-releases/2016/fortinet-security-fabric-named-2016-crn-network-security-product.

McCullagh, Declan, "How safe is instant messaging? A security and privacy survey," CNET, Jun. 9, 2008, 14 pgs.

Beck et al. "IBM and Cisco: Together for a World Class Data Center," IBM Redbooks, Jul. 2013, 654 pgs.

Martin, Victoria "Installing internal FortiGates and enabling a security fabric," The Fortinet Cookbook, Jun. 8, 2016, 11 pgs, archived Aug. 28, 2016 at https://web.archive.org/web/20160828235831/http://cookbook.fortinet.com/installing-isfw-fortigate-enabling-csf-54.

Zetter, Kim, "Revealed: The Internet's Biggest Security Hole," Wired, Aug. 26, 2008, 13 pgs.

Adya et al., Farsite: Federated, available, and reliable storage for an incompletely trusted environment, SIGOPS Oper. Syst. Rev. 36, SI, Dec. 2002, pp. 1-14.

Agrawal et al., "Order preserving encryption for numeric data," In Proceedings of the 2004 ACM SIGMOD international conference on Management of data, Jun. 2004, pp. 563-574.

Balakrishnan et al., "A layered naming architecture for the Internet," ASM SIGCOMM Computer Communication Review, 34(4), 2004, pp. 343-352.

Downing et al. , Naming Dictionary of Computer and Internet Terms, (11th Ed.) Barron's, 2013, 6 pgs.

Downing et al., Dictionary of Computer and Internet Terms, (10th Ed.) Barron's, 2009, 4 pgs.

Zoho Mail, "Email Protocols: What they are & their different types," 2006, 7 pgs. available at https://www.zoho.com/mail/glossary/email-protocols.html# :~: text=mode of communication.-,What are the different email protocols%3F, and also has defined functions.

NIIT, Special Edition Using Storage Area Networks, Que, 2002, 6 pgs.

Chapple, Mike, "Firewall redundancy: Deployment scenarios and benefits," Tech Target, 2005, 5 pgs. available at https://www.techtarget.com/searchsecurity/tip/Firewall-redundancy-Deployment-scenarios-and-benefits?% 20Offer=abt_pubpro_AI-Insider.

Fortinet, FortiGate—3600 User Manual (vol. 1 , Version 2.50 MR2) Sep. 5, 2003, 329 pgs.

Fortinet, FortiGate SOHO and SMB Configuration Example, (Version 3.0 MR5), Aug. 24, 2007, 54 pgs.

(56) References Cited

OTHER PUBLICATIONS

Fortinet, FortiSandbox—Administration Guide, (Version 2.3.2), Nov. 9, 2016, 191 pgs.
Fortinet, FortiSandbox Administration Guide, (Version 4.2.4) Jun. 12, 2023, 245 pgs. available at https://fortinetweb.s3.amazonaws.com/docs.fortinet.com/v2/attachments/fba32b46-b7c0-11ed-8e6d-fa163e15d75b/FortiSandbox-4.2.4- Administration_Guide.pdf.
Fortinet,FortiOS—Administration Guide, (Versions 6.4.0), Jun. 3, 2021, 1638 pgs.
Heady et al., "The Architecture of a Network Level Intrusion Detection System," University of New Mexico, Aug. 15, 1990, 21 pgs.
Kephart et al., "Fighting Computer Viruses," Scientific American (vol. 277, No. 5) Nov. 1997, pp. 88-93.
Wang, L., Chapter 5: Cooperative Security in D2D Communications, "Physical Layer Security in Wireless Cooperative Networks," 41 pgs. first online on Sep. 1, 2017 at https://link.springer.com/chapter/%2010.1007/978-3-319-61863-0_5.
Lee et al., "A Data Mining Framework for Building Intrusion Detection Models," Columbia University, n.d. 13 pgs. no date provided.
Merriam-Webster Dictionary, 2004, 5 pgs.
Microsoft Computer Dictionary, (5th Ed.), Microsoft Press, 2002, 8 pgs.
Microsoft Computer Dictionary, (4th Ed.), Microsoft Press, 1999, 5 pgs.
Mika et al. "Metadata Statistics for a Large Web Corpus," LDOW2012, Apr. 16, 2012, 6 pgs.
Oxford Dictionary of Computing (6th Ed.), 2008, 5 pgs.
Paxson, Vern, "Bro: a System for Detecting Network Intruders in Real-Time," Proceedings of the 7th USENIX Security Symposium, Jan. 1998, 22 pgs.
Fortinet Inc., U.S. Appl. No. 62/503,252, "Building a Cooperative Security Fabric of Hierarchically Interconnected Network Security Devices." n.d., 87 pgs No. date provided.
Song et al., "Practical techniques for searches on encrypted data," In Proceeding 2000 IEEE symposium on security and privacy. S&p. 2000, May 2000, pp. 44-55.
Dean, Tamara, Guide to Telecommunications Technology, Course Technology, 2003, 5 pgs,.
U.S. Appl. No. 60/520,577, "Device, System, and Method for Defending a Computer Network," Nov. 17, 2003, 21 pgs.
U.S. Appl. No. 60/552,457, "Fortinet Security Update Technology," Mar. 2004, 6 pgs.
Tittel, Ed, Unified Threat Management For Dummies, John Wiley & Sons, Inc., 2012, 76 pgs.
Fortinet, FortiOS Handbook: UTM Guide (Version 2), Oct. 15, 2010, 188 pgs.
Full Definition of Security, Wayback Machine Archive of Merriam-Webster on Nov. 17, 2016, 1 pg.
Definition of Cooperative, Wayback Machine Archive of Merriam-Webster on Nov. 26, 2016, 1 pg.
Pfaffenberger, Bryan, Webster's New World Computer Dictionary, (10th Ed.), 2003, 5 pgs.

* cited by examiner

700

Subscriber Schema

```
CREATE TABLE subscriber (
  UUMSI VARCHAR(20) PRIMARY KEY,
  tenant_id VARCHAR(50) PRIMARY KEY,
  subscription_id VARCHAR(50) NOT NULL,
  iccid VARCHAR(20) NOT NULL,
  eid VARCHAR(32),
  msisdn VARCHAR(20)
);
CREATE TABLE subscriber_imsi (
  UUMSI VARCHAR(20),
  imsi VARCHAR(15),
  PRIMARY KEY (UUMSI, imsi),
  FOREIGN KEY (UUMSI) REFERENCES subscriber(UUMSI)
);
CREATE TABLE subscriber_imei (
  UUMSI VARCHAR(20),
  imei VARCHAR(15),
  PRIMARY KEY (UUMSI, imei),
  FOREIGN KEY (UUMSI) REFERENCES subscriber(UUMSI)
);
CREATE TABLE apn (
  apn_id VARCHAR(20) PRIMARY KEY,
  apn_name VARCHAR(50) NOT NULL,
  apn_type VARCHAR(20) NOT NULL
);
CREATE TABLE subscriber_apn (
  UUMSI VARCHAR(20),
  apn_id VARCHAR(20),
  apn_ip_address VARCHAR(45),
  PRIMARY KEY (UUMSI, apn_id),
  FOREIGN KEY (UUMSI) REFERENCES subscriber(UUMSI),
  FOREIGN KEY (apn_id) REFERENCES apn(apn_id)
);
CREATE TABLE device_ip_mapping (
  UUMSI VARCHAR(20),
  device_ip VARCHAR(45),
  mapping_start_time TIMESTAMP,
  mapping_end_time TIMESTAMP,
  PRIMARY KEY (UUMSI, device_ip),
  FOREIGN KEY (UUMSI) REFERENCES subscriber(UUMSI)
);
CREATE TABLE security_policy (
  policy_id VARCHAR(20) PRIMARY KEY,
  policy_name VARCHAR(50) NOT NULL,
  policy_description TEXT,
  policy_type VARCHAR(20) NOT NULL,
  policy_action VARCHAR(20) NOT NULL,
  policy_priority INTEGER NOT NULL
);
CREATE TABLE subscriber_policy (
  UUMSI VARCHAR(20),
  policy_id VARCHAR(20),
  PRIMARY KEY (UUMSI, policy_id),
  FOREIGN KEY (UUMSI) REFERENCES subscriber(UUMSI),
  FOREIGN KEY (policy_id) REFERENCES security_policy(policy_id)
);
```

```
                    UUMSI Algorithm function createUUMSI(deviceType, TenantInfo, identifier):
if deviceType == "SIM":
     iccid = identifier.getICCID()
     UUMSI = normalizedUUMSI(iccid)
  else if deviceType == "eSIM":
     eid = identifier.getEID()
     UUMSI = normalizedUUMSI(eid)
  else if deviceType == "iSIM":
     isimId = identifier.getID()
     UUMSI = normalizedUUMSI(isimId)
  else:
     UUMSI = null
  Get TenantInfo;
  UUMSI = normalizedUUMSI(TenantInfo)
   return UUMSI function normalizedUUMSI(identifier):

// Pad the identifier with leading zeros if necessary to ensure a fixed
length
   fixedLengthUUMSI = padWithLeadingZeros(digitsOnly, 20)

return fixedLengthUUMSI function padWithLeadingZeros(identifier, targetLength):
   // Pad the identifier string with leading zeros to reach the target length
   // Implementation depends on the specific programming language
```

FIG. 8

GLOBAL SECURE SIM CLIENTLESS SASE ARCHITECTURE FOR CELLULAR DEVICES

BACKGROUND

This disclosure relates, in general, to internet security and data protection systems and, not by way of limitation, to a global secure architecture for cellular devices, among other things.

The traditional SIM Secure Access Service Edge (SASE) architecture in cellular networks refers to a security framework that integrates network and security functions with WAN capabilities to support the dynamic, secure access requirements of organizations. In this architecture, the security services are delivered at the network edge, closer to the users and devices, which can include IoT and OT devices that rely on cellular networks for connectivity.

The traditional SIM SASE architecture is challenged by its software client dependency, which is at odds with the low-power, application-specific operating systems of many cellular IoT devices. This design is not conducive to the decentralized, scalable, and secure approach entailed for modern enterprise operations, particularly in the context of mobile and IoT device security. These limitations underscore the requirement for a new, more adaptable security framework that can meet the demands of today's mobile networks and the diverse array of devices they support.

SUMMARY

In one embodiment, the present disclosure provides a clientless security system to secure cellular devices across a network in a cloud-based environment. The clientless security system includes a tenant with multiple cellular devices, tunnels for transmitting traffic, and a traffic steering module for directing traffic towards a gateway. The clientless security system further includes gateways to apply policies based on a device profile and an alert generator. The traffic steering module provides a SIM with network identifiers, configures the SIM with a custom network identifier, creates a device-to-IP mapping, and distributes the device to IP mapping to gateways in real-time. The gateways apply multiple policies based on a device profile, receive traffic from the traffic steering module, and perform a reverse lookup. The gateways further determine a device identity, apply policies, and forward traffic to a destination. The alert generator is also used to notify the tenant of further remediation in case of policy violations.

In an embodiment, a clientless security system to secure cellular devices across a network in a cloud-based environment. The clientless security system includes a tenant with multiple cellular devices, tunnels for transmitting traffic, and a traffic steering module for directing traffic towards a gateway. The clientless security system further includes gateways to apply policies based on a device profile and an alert generator. The traffic steering module provides a SIM with network identifiers, configures the SIM with a custom network identifier, creates a device-to-IP mapping, and distributes the device to IP mapping to gateways in real-time. The custom network identifier is used for traffic segregation in the cellular network and the custom network identifier is an APN for a 4G network and a DNN for a 5G network. The device-to-IP mapping is created using a universal unique mobile subscriber identity (UUMSI) identifier as primary key. The gateways apply multiple policies based on a device profile, receive traffic from the traffic steering module, and perform a reverse lookup. The gateways further determine a device identity, apply policies, and forward traffic to a destination. The alert generator is also used to notify the tenant of further remediation in case of policy violations. The remediation done by the gateways includes blocking corresponding traffic, quarantining the cellular device, and allowing limited connectivity to the cellular device.

In an embodiment, a clientless security method to secure cellular devices across a network in a cloud-based environment. In one step, the clientless security method includes transmitting traffic of a cellular device and using a traffic steering module for directing traffic towards a gateway. The clientless security method further includes applying policies based on a device profile using gateways. The traffic steering module provides a SIM with network identifiers, configures the SIM with a custom network identifier, creates a device-to-IP mapping, and distributes the device to IP mapping to gateways in real-time. The custom network identifier is used for traffic segregation in the cellular network and the custom network identifier is an APN for a 4G network and a DNN for a 5G network. The device-to-IP mapping is created using a universal unique mobile subscriber identity (UUMSI) identifier as primary key. The gateways apply multiple policies based on a device profile, receive traffic from the traffic steering module, and perform a reverse lookup. The gateways further determine a device identity, apply policies, and forward traffic to a destination. Finally, the clientless security method notifies a tenant of further remediation in case of policy violations. The remediation done by the gateways includes blocking corresponding traffic, quarantining the cellular device, and allowing limited connectivity to the cellular device.

In yet another embodiment, a computer-readable media is discussed having computer-executable instructions embodied thereon that when executed by one or more processors, facilitate a clientless security method to secure cellular devices across a network in a cloud-based environment. In one step, the clientless security method includes transmitting traffic of a cellular device and using a traffic steering module for directing traffic towards a gateway. The clientless security method further includes applying policies based on a device profile using gateways. The traffic steering module provides a SIM with network identifiers, configures the SIM with a custom network identifier, creates a device-to-IP mapping, and distributes the device to IP mapping to gateways in real-time. The custom network identifier is used for traffic segregation in the cellular network and the custom network identifier is an APN for a 4G network and a DNN for a 5G network. The device-to-IP mapping is created using a universal unique mobile subscriber identity (UUMSI) identifier as primary key. The gateways apply multiple policies based on a device profile, receive traffic from the traffic steering module, and perform a reverse lookup. The gateways further determine a device identity, apply policies, and forward traffic to a destination. Finally, the clientless security method notifies a tenant of further remediation in case of policy violations. The remediation done by the gateways includes blocking corresponding traffic, quarantining the cellular device, and allowing limited connectivity to the cellular device.

Further areas of applicability of the present disclosure will become apparent from the detailed description provided hereinafter. It should be understood that the detailed description and specific examples, while indicating various embodi-

BRIEF DESCRIPTION OF THE DRAWINGS

The present disclosure is described in conjunction with the appended figures:

FIG. 7 illustrates an algorithmic representation of a database schema of the clientless security system;

FIG. 8 illustrates an algorithmic representation of a universal unique mobile subscriber identifier (UUMSI) for cellular security;

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
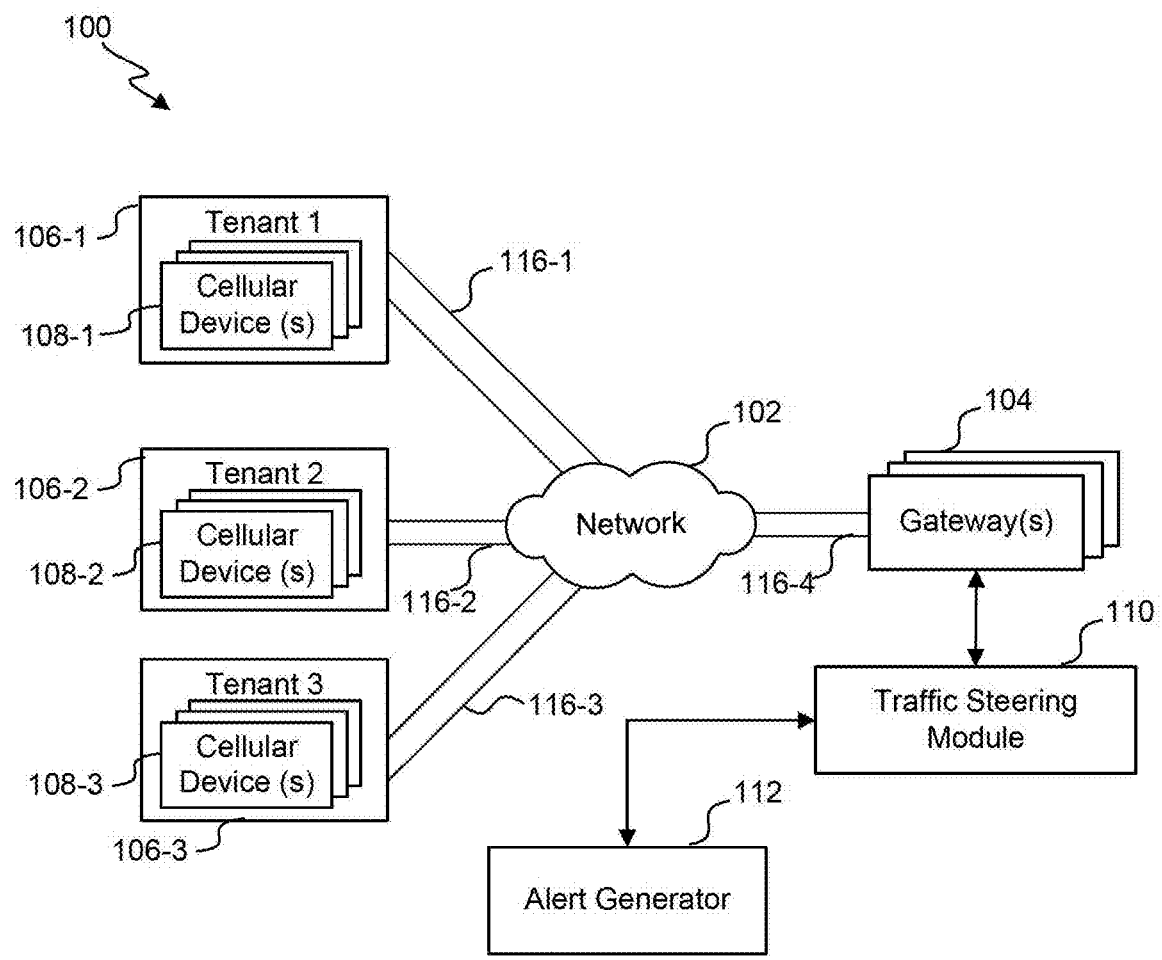
FIG. 1 illustrates a block diagram of an embodiment of a clientless security system to secure cellular devices across a cellular network in a cloud-based environment.

Referring to FIG. 1, a block diagram of an embodiment of a clientless security system 100 to secure cellular devices across a cellular network in a cloud-based environment is shown. The clientless security system 100 is targeted toward enterprises, service providers, and solution vendors who are deploying and managing large-scale cellular networks. The clientless security system 100 provides a clientless Secure Access Service Edge (SASE) solution that extends enterprise-grade security capabilities to cellular devices while leveraging the existing cellular network infrastructure and Subscriber Identity Module (SIM)/embedded SIM (eSIM)/integrated SIM (iSIM) technologies. By eliminating the requirement for client-side modifications, the clientless security system 100 enables scalable, efficient, and comprehensive security for a wide range of devices and applications.

The clientless security system 100 addresses the challenge of securing cellular devices and their communications without relying on client-side software or hardware modifications. The clientless security system 100 works at a hypervisor (data-link) layer of a cloud open systems interconnection (OSI) model. As the number of devices connected through cellular networks continues to grow exponentially, ensuring the security of these devices and their data becomes increasingly exigent. Traditional security solutions often require the installation of client software or agents on the devices themselves, which can be impractical or infeasible for many use cases due to resource constraints, proprietary operating systems, or the sheer scale of deployment.

The clientless security system 100 includes a network 102, gateway(s) 104, tenant(s) 106 (106-1, 106-2, 106-3), cellular Device(s) 108 (108-1, 108-2, 108-3), and tunnel(s) 116 (116-1, 116-2, 116-3, 116-4). The clientless security system 100 further includes a traffic steering module 110, and an alert generator 112. The network 102 is a cellular network connecting the tenant(s) 106 and transmitting traffic between the cellular devices 108 and the gateways 104. From here on, the terms "cellular network" and "network" will be used interchangeably in this application.

The 4G/5G cellular network provides connectivity and data transmission capabilities for the cellular devices 108. The clientless security system 100 uses the existing mechanism provided by the 4G/5G network to enable device authentication as well as secure traffic steering and segmentation using custom Access Point Names (APNs) for the 4G network or custom Data Network Names (DNNs) for the 5G network. Based on the device identity and APN/DNN configuration, the 4G/5G network creates secure pathways for traffic by segmenting the traffic based on device identity and intended destination in the SASE domain.

The tenant 106 links with multiple cellular devices that access the applications provided on the network 102. The cellular devices 108 are portable electronic devices that use cellular network technology to enable wireless communication. The cellular devices 108 encompass a wide range of gadgets, including smartphones, tablets, and certain types of computers. These devices can transmit data and access the internet. They operate over a network of cells, each served by a base station, allowing for seamless communication even when the user is on the move.

The cellular devices 108 connects to the cellular (4G/5G) network using the SIM which can be a physical SIM, eSIM, or iSIM, which stores the device's network identifiers and security credentials. Global Secure SIM provided by the clientless security system 100 for device connectivity is configured with multiple network identifiers i.e. International mobile subscriber identity (IMSIs) which can be managed Over the Air (OTA) so that the device's data connectivity is not tied to any specific mobile network operator (MNO). From now on in this document, "SIM" will be used as a generic term to represent all different forms like physical SIM, eSIM, and iSIM.

The cellular devices 108 with Global Secure SIM are configured with custom access point name (APN) for LTE and data network name (DNN) for the 5G network to ensure that the cellular device traffic is segregated and routed through the designated security gateways in the SASE domain for inspection and policy enforcement. In this application, the SIM/eSIM/iSIM enabled IoT devices are referred to as "cellular devices" from hereon.

The tunnels 116 of the clientless security system 100 are IPsec protected pathways used to secure network communications. This provides a means to establish encrypted connections across public networks. Traffic incoming from different tenants remains separated in the tunnels 116. IPsec is a suite of protocols designed to ensure the confidentiality, integrity, and authenticity of data packets as they travel over the internet or other untrusted networks. It operates by encrypting and encapsulating IP packets, effectively creating a tunnel through which data can pass securely. This is particularly useful for virtual private networks (VPNs), where sensitive information has to be protected from potential interception. Furthermore, the tunnels 116 receive traffic from the cellular device 108 at the cellular network and identifies traffic using network identifiers.

The gateways 104 in a cellular network serve as the point of interconnection where data is translated and transferred between disparate network protocols. The gateways 104 are responsible for tasks such as authentication, routing, and packet optimization, which are cardinal for the operation of 3G, 4G, and 5G networks. The gateways 104 ensure that the cellular devices 108 can connect to the core network and that data can flow smoothly and securely from one part of the network to another. The gateways 104 also manage the traffic that enters and exits the network, maintaining the integrity and efficiency of the communication processes within the cellular network infrastructure. The gateways 104 of the clientless security system 100 receive security policies, device-to-IP mappings, and configuration updates from the SASE management plane and enforce the security policies and access controls defined by the management plane on the device traffic.

The gateways 104 further send real-time telemetry data, logs, and security events to the management plane for analysis and reporting. It also enables dynamic adaptation of security measures based on the instructions received from the SASE management plane and receives and processes incoming traffic from devices steered through the cellular network. The traffic steering module 110 is used to route traffic of the cellular devices 108 towards the gateway 104 in the cellular network. The traffic steering module 110 provisions the SIM with network identifiers such as APN in the 4G network and DNN in 5G network. The SIM is configured with a custom network identifier or universal unique mobile subscriber identifier (UUMSI) and a "device-to-IP mapping" is created at the cellular network. The traffic steering module 110 then distributes the device-to-IP mapping to the gateways 104 in real-time and routes the traffic to the gateways 104 using custom network identifiers. Finally, the alert generator 112 notifies the tenant(s) 106 in the cloud-based environment for further remediation in case of detection of violation of a policy.

Figure 2:
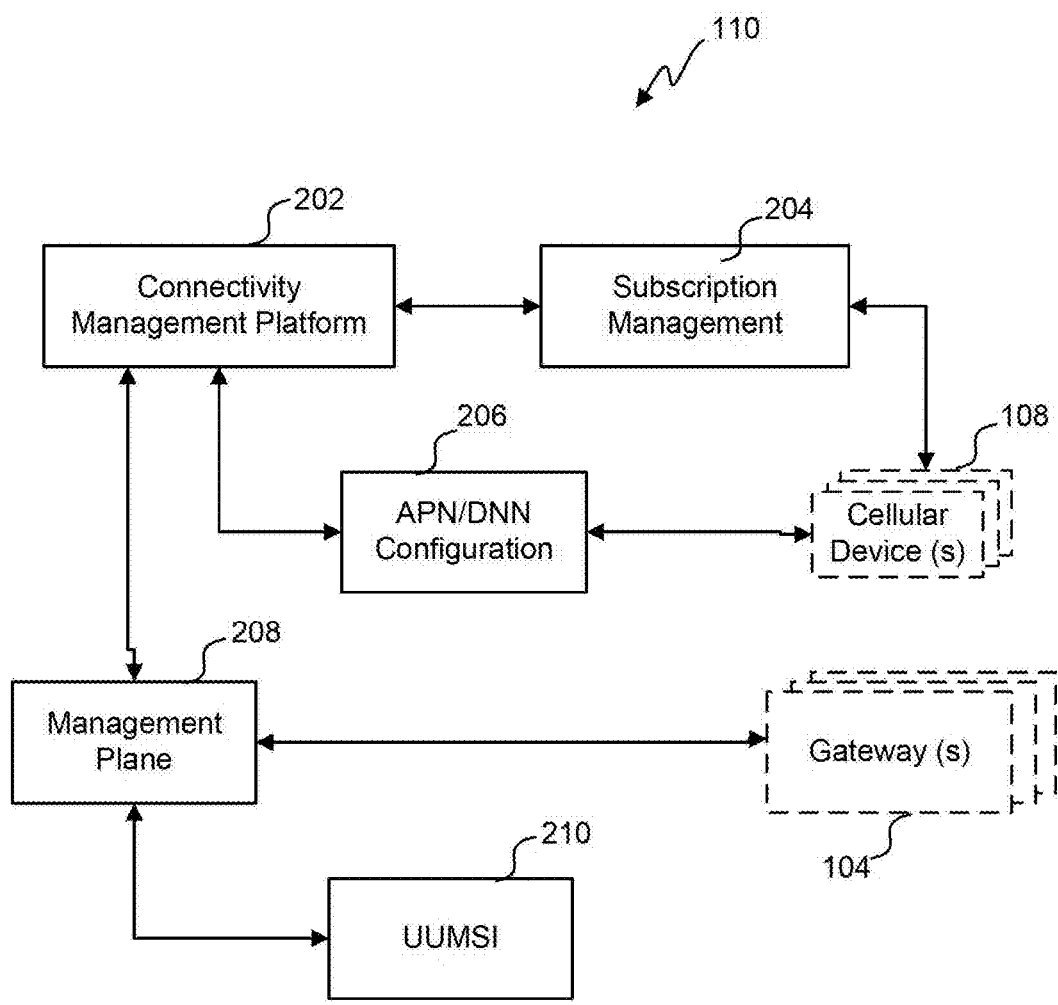
FIG. 2 illustrates a block diagram of a traffic steering module of the clientless security system.

Referring next to FIG. 2, a block diagram of the traffic steering module 110 of the clientless security system 100 is shown. The traffic steering module 110 is used to route traffic towards the secured gateways in the cloud-based environment. The components of the traffic steering module 110 interact seamlessly to provide a multi-layered security approach. The traffic steering module 110 consists of a connectivity management platform 202, a subscription management 204 block, an APN/DNN configuration 206 block, a management plane 208, and a universal unique mobile subscriber identifier (UUMSI) 210 block. The connectivity management platform 202 handles the provisioning and lifecycle management of SIM. The connectivity management platform 202 manages the SIM profiles with pertinent network identifiers (IMSIs) over-the-air (OTA), allowing the cellular devices 108 with SIMs to have global connectivity over the 4G/5G network. The connectivity management platform 202 also configures the SIM profile with a custom APN for 4G networks or custom DNN for 5G networks and ensures the cellular device 108 connects to designated cellular network infrastructure using specified custom APN/DNN to enable traffic segregation and secure routing of device traffic through 4G/5G network to designated SASE Gateway.

The connectivity management platform 202 further communicates with Subscription management 204 block in 4G/5G Packet Core over specific telecom protocol interface (Gx interface) or using REST APIs to request and manage IPv4/IPv6 address assignments for SIM. The subscription management 204 block maintains the SIM subscription inventory including their associated SIM/eSIM/iSIM profiles, network identifiers, and provisioning status. The subscription management 204 block acts as a policy and configuration management entity with capabilities to configure data usage limits, network access (allow, suspend, restrict), network/location changes, etc. which can be leveraged programmatically to manage a device's connectivity.

The connectivity management platform 202 further provides RESTful API interfaces for seamless integration with the management plane 208 for sharing device provisioning data, IP address assignments, and other relevant information, which enables management plane 208 to retrieve device details and create the device-to-IP mappings. The APN/DNN configuration 206 block assigns custom APNs/DNNs on the SIM/eSIM/iSIM to steer traffic of the cellular devices 108 to the nearest SSE gateway. The management plane 208 allows for the centralized configuration, monitoring, and enforcement of security policies across a cellular network. This approach simplifies the management of security policies, ensuring that they are consistently applied to all devices, regardless of their location. By leveraging the management plane 208, the tenant(s) 106 can streamline their security operations, reduce the complexity of managing numerous devices, and respond more swiftly to security threats. The management plane 208 enhances visibility and control over the network, enabling administrators to implement and adjust policies with case and precision.

The management plane 208 retrieves device and subscription details from the connectivity management platform 202 for creating a UUMSI for individual cellular device based on the retrieved information. The management plane 208 establishes and maintains a mapping between the UUMSI and the device's assigned IP address using the "device-to-IP mapping". The UUMSI addresses the limitations of traditional identifiers and provides a secure, scalable, and interoperable solution for device identification and access control in a client-less SASE environment. By leveraging UUMSI, the clientless security system 100 can effectively manage and secure the cellular devices 108, enforce granular security policies, and enhance the overall security posture of cellular deployments. The management plane 208 also helps in defining and managing security policies for the cellular devices 108 based on their identity, tenant, and application requirements with device level granularity in real-time to adapt to changing security requirements.

The management plane 208 distributes the "device-to-IP" mapping information to the gateways 104 that are related to the traffic in real-time and coordinates with connectivity management platform 202 for intelligent traffic steering to route device traffic to highly suitable SASE gateway based on device location, network conditions, and security requirements to influence routing decisions from the 4G/5G network to the gateway 104 for in-line security. The management plane 208 further identifies the gateways 104 which can be leveraged for fail-over scenarios to ensure disruption free service.

The UUMSI 210 block provides a unique identifier for each cellular device, regardless of the specific type of identifier used by the device (e.g., ICCID for SIM, EID for eSIM, or iSIM ID for iSIM). Unlike traditional identifiers like International mobile subscriber identity (IMSI) or international mobile equipment identity (IMEI), which can be subject to spoofing or cloning, UUMSI is designed to be immutable and tamper resistant. The UUMSI 210 block derives the unique identifier from device-specific identifiers, making it more secure and reliable for device identification and authentication. UUMSI follows a standardized format, typically consisting of a fixed-length string of digits. This standardization allows for interoperability and compatibility across different cellular networks, platforms, and security systems. UUMSI is used to establish a mapping between the cellular device 108 and the corresponding tenant or organization within the SASE domain. This mapping enables granular access control and policy enforcement based on the device's identity and associated tenant. The fixed-length and all-digit format of UUMSI enables efficient storage, indexing, and comparison operations. This facilitates fast and scalable device lookup and policy enforcement, making it suitable for large-scale cellular deployments.

Figure 3:
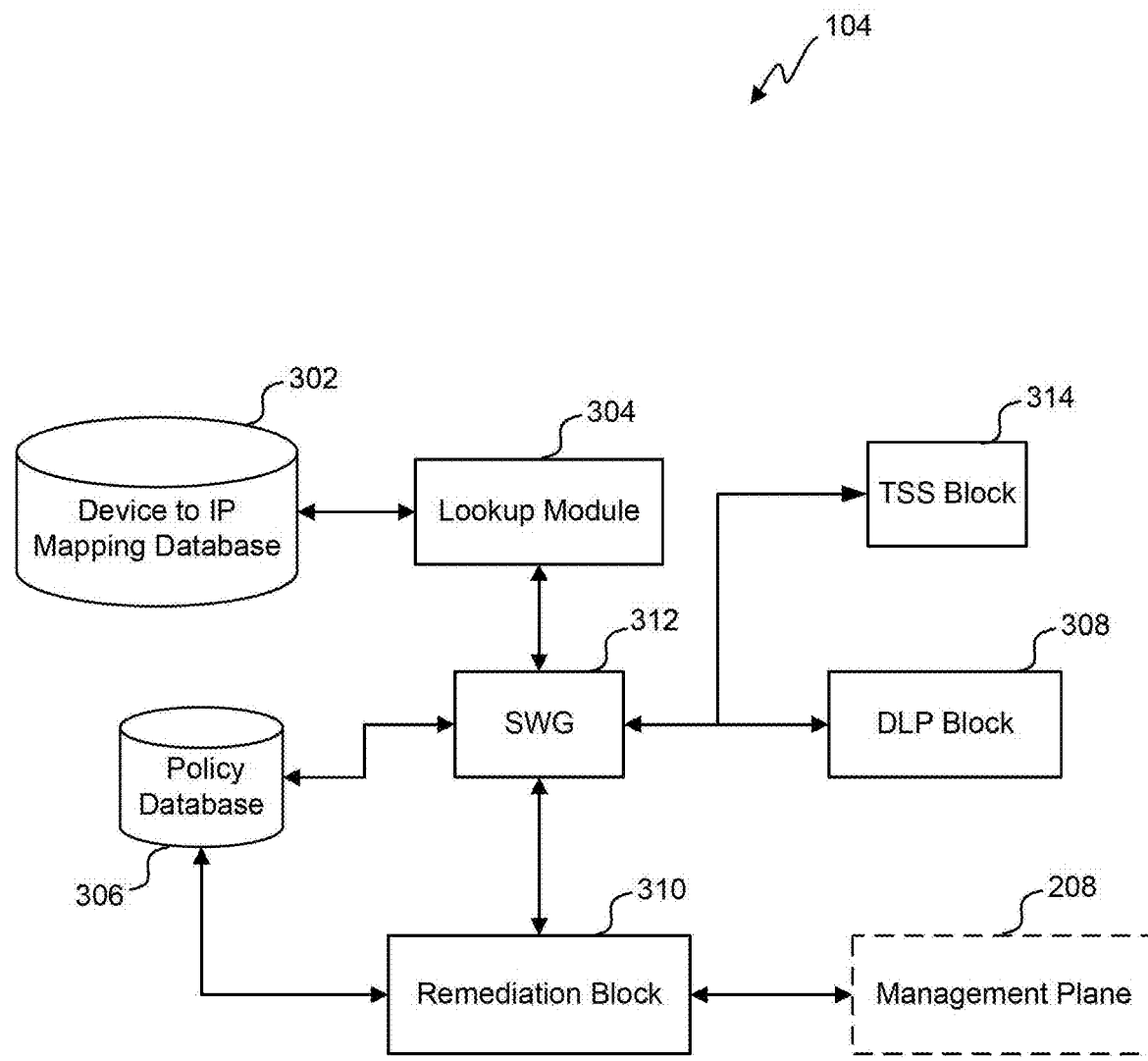
FIG. 3 illustrates a block diagram of a gateway for applying policies and analyzing incoming traffic.

Referring next to FIG. 3, a block diagram of the gateway 104 for applying policies and analyzing incoming traffic is shown. The gateways 104 in a cellular network serve as the point of interconnection where data is translated and transferred between disparate network protocols. The gateways 104 are responsible for tasks such as authentication, routing, and packet optimization, which are essential for the operation of 3G, 4G, and 5G networks. The gateways 104 ensure that the cellular devices 108 can connect to the core network and that data can flow smoothly and securely from one part of the network to another. The gateways 104 also manage the traffic that enters and exits the network, maintaining the integrity and efficiency of the communication processes within the cellular network infrastructure. The gateways 104 of the clientless security system 100 receive security policies, device-to-IP mappings, and configuration updates from the management plane 208 and enforce the security policies and access controls defined by the management plane 208 on the device traffic. The policies define inline security functions and access controls based on the tenant(s) 106 and a device identity. The gateways 104 further sends real-time telemetry data, logs, and security events to the management plane 208 for analysis and reporting. It also enables dynamic adaptation of security measures based on the instructions received from the management plane 208 and receives and processes incoming traffic from devices steered through the cellular network.

The gateway 104 includes a device-to-IP mapping database 302, a lookup module 304, a policy database 306, a DLP block 308, a remediation block 310, a secure web gateway (SWG 312), and a target set selection (TSS) block 314. The device-to-IP mapping database 302 stores the mappings that were created by the management plane 208 to identify the cellular device 108 in the cellular network. All new mappings are stored, updated, and distributed by the device-to-IP mapping database 302 in real-time. The lookup module 304 acts as an identity management system and performs a reverse lookup using a source IP address to determine the device identity corresponding to traffic. The lookup module 304 finds the identity of the cellular device 108 corresponding to traffic and sends it to the SWG 312.

The operation of the SWG 312 is based on a set of predefined security rules and policies that are applied to web traffic. These policies can be configured to block or allow access to specific uniform resource locators (URLs), limit the transfer of sensitive information, and detect and block advanced threats like zero-day malware. The SWG 312 uses URL filtering, which involves categorizing websites into groups based on their content and reputation, and then applying access controls based on these categories. For example, a company might block access to social media sites during work hours or prevent employees from accessing websites known to host malware.

In addition to URL filtering, the SWG 312 often includes data loss prevention (DLP) capabilities to monitor and control data being transmitted to and from the network. This helps in preventing sensitive information from leaving the corporate network unintentionally. Moreover, the SWG 312 performs SSL decryption, inspecting encrypted traffic for hidden threats and forwarding the traffic to a destination in the cloud-based environment. The clientless security system 100 provides security to the cellular device 108 in both cases; where the cellular device 108 has a certificate installed or not for hypertext transfer protocol (HTTP) communication. The certificate is an organization's package installed at the cellular device 108 to provide global secure SIM clientless SASE solution. For the cases where there is no way to install HTTPS trusted certificate, the clientless security system 100 uses a server name identification (SNI) based URL filtering method to keep the cellular device 108 safe. SNI based URL filtering can also be performed on the traffic at the firewall that utilizes the SNI filed, which is part of the Transport Layer Security (TLS) handshake process, to determine the hostname of the server that the client is attempting to connect to.

The DLP block 308 retrieves policies from the policy database 306. The policy database 306 has a multitude of policies that support varied rules and conditions, which could be based on user identity, device type, application, and content type. The device profile for individual tenant(s) is created by analyzing its policies, traffic patterns, and device types associated with tenant(s) 106. The DLP block 308 analyzes the traffic to find any anomaly or violation of a policy. For this purpose, the DLP block 308 incorporates features of a zero-trust network access (ZTNA) and a cloud access security broker (CASB). The DLP block 308 applies policies on the traffic instance based on the device identity. Upon detection of a violation of a policy or multiple policies, an alert is generated to notify the tenant(s) 106 for further remediation. The remediation block 310 at the gateway 104 triggers event-based actions based on the SASE platform provided input to the connectivity management platform 202 for enforcing real-time security. For example, if the device traffic is identified as malicious by the gateway 104, the management plane 208 will send a command to the connectivity management platform 202 to suspend/terminate device connectivity.

Furthermore, for forwarding traffic to a destination in the cloud-based environment, the gateway 104 would require the TSS block 314 along with the SWG 312 component with URL filtering, SSL decryption, and advanced threat protection features. By leveraging advanced threat intelligence, the SWG 312 and the DLP block 308 can identify and block access to known malicious websites, thereby preventing malware infections and other security breaches. It also enforces corporate and regulatory policies by controlling access to unauthorized web content, ensuring that strictly safe and approved communication passes through. In the context of cellular network gateways, the TSS block 314 is used to optimize data flow across the cellular network. The TSS block 314 selects the best nodes or targets for data transfer, which can help in managing network traffic and improving overall efficiency. This selection is based on various criteria, such as the type of data, its destination, and the current network conditions. The TSS block 314 ensures that the cellular network can handle large volumes of data effectively, especially in scenarios where data offloading is necessary to prevent congestion and maintain high performance.

Figure 4:
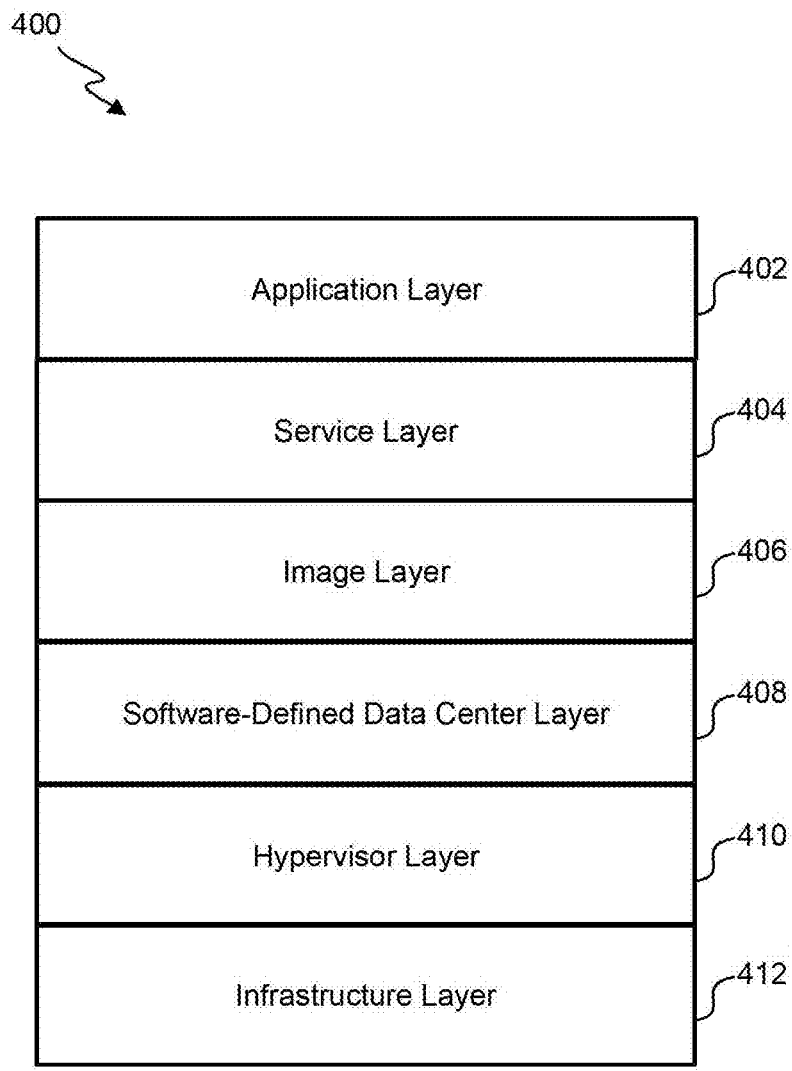
FIG. 4 illustrates a block diagram of an embodiment of a cloud open systems interconnection (OSI) model.

Referring next to FIG. 4, a block diagram of an embodiment of a cloud open systems interconnection (OSI) model 400 is shown. The cloud OSI model 400 for cloud computing environments partitions the flow of data in a communication system into six layers of abstraction. The cloud OSI model 400 for cloud computing environments can include, in order: an application layer 402, a service layer 404, an image layer 406, a software-defined data center layer 408, a hypervisor layer 410, and an infrastructure layer 412. The respective layer serves a class of functionality to the layer above it and is served by the layer below it. Classes of functionality can be realized in software by various communication protocols.

The infrastructure layer 412 can include hardware, such as physical devices in a data center, that provides the foundation for the rest of the layers. The infrastructure layer 412 can transmit and receive unstructured raw data between a device and a physical transmission medium. For example, the infrastructure layer 412 can convert the digital bits into electrical, radio, or optical signals.

The hypervisor layer 410 can perform virtualization, which can permit the physical devices to be divided into virtual machines that can be bin-packed onto physical machines for greater efficiency. The hypervisor layer 410 can provide virtualized computing, storage, and networking. For example, OpenStack® software that is installed on bare metal servers in a data center can provide virtualization cloud capabilities. The OpenStack® software can provide various infrastructure management capabilities to cloud operators and administrators and can utilize the Infrastructure-as-Code concept for deployment and lifecycle management of a cloud data center. In the Infrastructure-as-Code concept, the infrastructure elements are described in definition files. Changes in the files are reflected in the configuration of data center hosts and cloud services.

In the traditional OSI model, the data link layer is responsible for node-to-node data transfer and error handling within the same network segment. When considering the cloud OSI model, which adapts the traditional layers to fit cloud computing environments, the equivalent of the data link layer could be seen as part of the hypervisor layer. The hypervisor layer in the cloud OSI model 400 deals with virtualization, providing virtual network interface cards (NICs) for virtual machines (VMs) that interact with the data link layer's functions. It manages the virtual switches that handle data traffic between VMs, ensuring that the data link layer protocols are adhered to for accurate communication within the virtualized environment. This layer ensures that the cloud infrastructure maintains the mechanisms pertinent to data transfer and reliability, akin to the data link layer's role in the traditional model. Understanding this correspondence is cardinal for network professionals working with cloud-based technologies.

The software-defined data center layer 408 can provide resource pooling, usage tracking, and governance on top of the hypervisor layer 410. The software-defined data center layer 408 can enable the creation of virtualization for the Infrastructure-as-Code concept by using representational state transfer (REST) application programming interfaces (APIs). The management of block storage devices can be virtualized, and users can be provided with a self-service API to request and consume those resources which do not entail any knowledge of where the storage is deployed or on what type of device. Various compute nodes can be balanced for storage.

The image layer 406 can use various operating systems and other pre-installed software components. Patch management can be used to identify, acquire, install, and verify patches for products and systems. Patches can be used to rectify security and functionality problems in software. Patches can also be used to add new features to operating systems, including security capabilities. The image layer 406 can focus on computing in place of storage and networking. The instances within the cloud computing environments can be provided at the image layer 406.

The service layer 404 can provide middleware, such as functional components that applications use in tiers. In some examples, the middleware components can include databases, load balancers, web servers, message queues, email services, or other notification methods. The middleware components can be defined at the service layer 404 on top of specific images from the image layer 406. Different cloud computing environment providers can have different middleware components. The application layer 402 can interact with software applications that implement a communicating component. The application layer 402 is the layer that is closest to the user. Functions of the application layer 402 can include identifying communication partners, determining resource availability, and synchronizing communications. Applications within the application layer 402 can include custom code that makes use of middleware defined in the service layer 404.

Various features discussed above can be performed at multiple layers of the cloud OSI model 400 for cloud computing environments. For example, translating the general policies into specific policies for different cloud computing environments can be performed at the service layer 404 and the software-defined data center layer 408. Various scripts can be updated across the service layer 404, the image layer 406, and the software-defined data center layer 408. Further, APIs and policies can operate at the software-defined data center layer 408 and the hypervisor layer 410.

Different cloud computing environments can have different service layers, image layers 406, software-defined data center layers 408, hypervisor layers 410, and infrastructure layers 412. Further, respective cloud computing environments can have the application layer 402 that can make calls to the specific policies in the service layer 404 and the software-defined data center layer 408. The application layer 402 can have noticeably the same format and operation for respective different cloud computing environments. Accordingly, developers for the application layer 402 are not obliged to understand the peculiarities of how respective cloud computing environments operate in the other layers.

Figure 5:
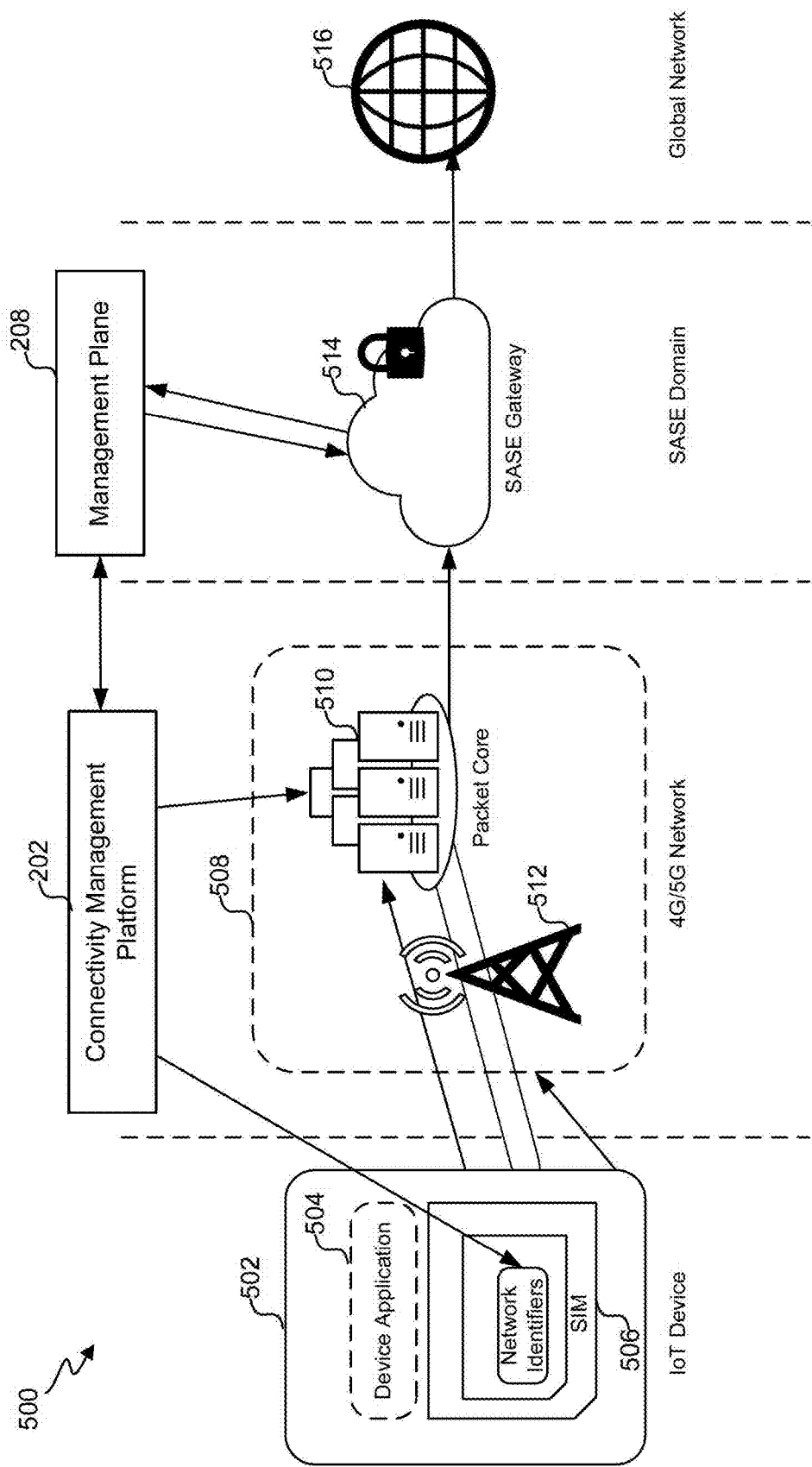
FIG. 5 illustrates a sequence diagram of an architecture for a clientless SASE solution.

Referring next to FIG. 5, a sequence diagram of an architecture for clientless SASE solution 500 is shown. The clientless SASE solution 500 includes an IoT device 502 that has a device application 504 and a SIM 506 installed. The SIM 506 carries the network identifiers. The clientless SASE solution 500 further includes 4G/5G network 508, the connectivity management platform 202, the management plane 208, a SASE gateway 514, and a global network 516. The 4G/5G network 508 has signal transmitters 512 and packet core 510. In the clientless SASE solution 500 all these components interact amongst one another to provide a global SIM secure clientless SASE architecture for the cellular devices 108.

As a first step, the connectivity management platform 202 provisions the SIM/eSIM/iSIM with multiple network identifiers (IMSIs) and configured with Custom APN for 4G or custom DNN for 5G. The IoT device 502 authenticates with the 4G/5G network 508 using the network identifier in the SIM and is in active state with IPv4/IPv6 address assigned to the IoT device 502. Next, the connectivity management platform 202 coordinates with 4G/5G subscription management entity in the packet core 510 over Gx Interface or using REST API to get/assign static/dynamic IP assignment in subnet range specific to custom APN in 4G network or custom DNN in 5G network. The management plane 208 then retrieves account and subscription details from the connectivity management platform 202 to create "device-to-IP mapping" using a UUMSI identifier as the Primary key. Finally, the management plane 208 distributes "Device-to-IP" mapping to the relevant SASE gateways in real-time.

When the IoT device 502 initiates a data session, the traffic is securely steered through the packet core network using the custom APN in 4G or DNN in 5G. For this purpose, the cellular network identifies the traffic associated with the custom APN or DNN and routes it to the designated SASE gateway using the intelligent traffic steering mechanism. The SASE gateway 514 receives the traffic, performs a reverse lookup using the source IP address to determine the corresponding device identity (UUMSI), and applies the appropriate security policies, access controls, and inline security functions (Firewall, ACLs, etc.) based on the device's identity and tenant-specific requirements. If the traffic is deemed secure and compliant, the SASE gateway 514 forwards it to the intended destination. If any suspicious activity or policy violations are detected, the SASE gateway 514 takes appropriate actions, such as blocking the traffic, quarantining the device, or sending alerts. At the end, the SASE gateway 514 sends real-time telemetry and logs to the management plane 208, providing a centralized view of the security posture across all connected cellular devices.

Figure 6:
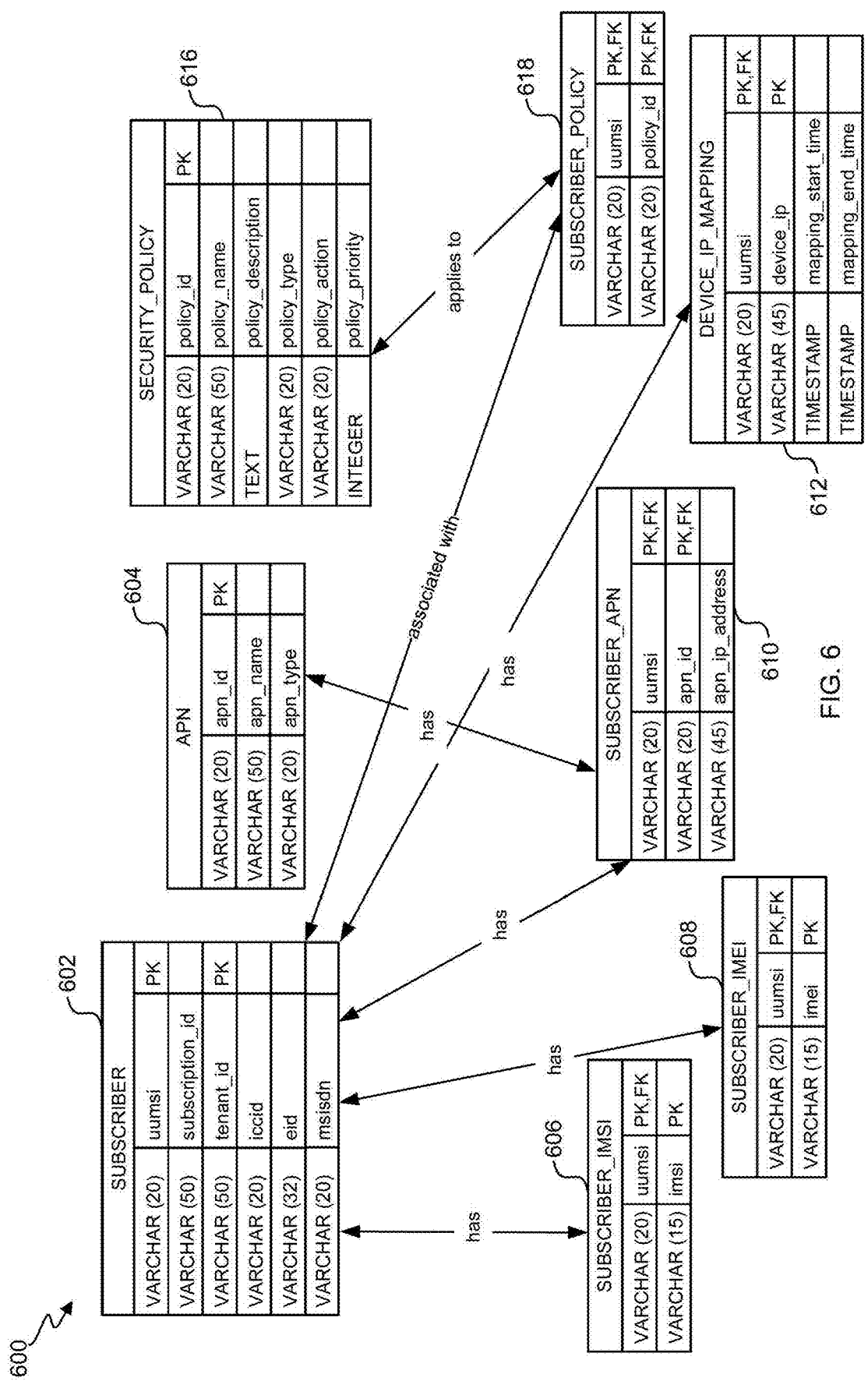
FIG. 6 illustrates an entity relationship diagram representing a "device-to-IP" mapping at the cellular network.

Referring next to FIG. 6, an entity relationship diagram 600 representing a "device-to-IP" mapping at the cellular network is shown. The presented SQL schema and entity relationship diagram 600 (ERD) showcases a novel approach to enable the clientless SASE solution 500 for the cellular devices 108. The clientless SASE solution 500 leverages the power of a UUMSI as a unique identifier for individual devices, allowing for efficient device-to-IP mapping and granular security policy enforcement. Some aspects of "Device-to-IP Mapping Database 302" include: UUMSI as a central identifier, flexible device identity management, real-time Device-to-IP mapping, granular security policy definition, and scalable and efficient policy enforcement.

The UUMSI serves as the primary key in a 'subscriber' table 602, acting as a universal identifier for individual cellular devices. This approach simplifies device identification and enables seamless integration with the SASE framework. The entity relationship diagram 600 incorporates separate tables; a 'subscriber_imsi' 606 and a 'subscriber_imei' 608 to handle multiple IMSIs and IMEIs associated with a single UUMSI. This flexibility accommodates modern SIM scenarios, such as multi-IMSI profiles and device switching. An 'apn' table 604 provides the identification, type, and name of the APN used and contains a 'subscriber_apn' table 610 that provides the IP addresses corresponding to the APN.

A 'device_ip_mapping' table 612 captures the real-time mapping between a device's UUMSI and its assigned IP address. This mapping allows the management plane 208 to efficiently distribute the information to the SASE gateways 514, enabling quick policy enforcement based on the device's IP address. A 'security_policy' table 618 allows for the definition of fine-grained security policies, including attributes like policy type, action, and priority. These policies can be associated with specific subscribers through a 'subscriber_policy' table 616, enabling personalized and context-aware security enforcement. By associating security policies directly with the UUMSI, the schema enables the SASE gateways 514 to quickly retrieve and enforce the relevant policies for individual devices based on its IP address. This approach ensures scalable and efficient policy enforcement in real-time, even in large-scale cellular deployments.

Referring next to FIG. 7, an algorithmic representation of a subscriber schema 700 of the clientless security system 100 is shown. The subscriber schema 700 provided outlines a database structure for a clientless SASE solution for the cellular devices 108. The 'subscriber' table serves as the foundation, storing unique identifiers and subscription details for individual users. The 'subscriber_imsi' and 'subscriber_imei' tables 606 and 608 respectively extend this by mapping individual subscribers to their respective International Mobile Subscriber Identity (IMSI) and International Mobile Equipment Identity (IMEI), ensuring secure identification of both the user and their device.

The 'apn' table holds information about the Access Point Name (APN), which is decisive for connecting to different networks, while the 'subscriber_apn' table links subscribers to their assigned APNs and IP addresses, facilitating network access and management. The 'device_ip_mapping' table tracks the dynamic allocation of IP addresses to devices, recording the time span of individual mapping which is cardinal for maintaining session continuity and security. Lastly, the 'security_policy' table defines the security policies in place, detailing their actions and priorities, and the 'subscriber_policy' table associates these policies with individual subscribers, allowing for personalized security measures. The subscriber schema 700 is useful in enabling a SASE solution that provides secure, scalable, and efficient network access for cellular devices. The subscriber schema 700 ensures that individual components of the network access and security process are accounted for, from subscriber and tenant identification to policy enforcement, creating a comprehensive framework for secure connectivity.

The 'subscriber' table of the subscriber schema 700 includes fields like 'UUMSI,' 'iccid,' and 'eid,' which are directly related to the SIM card. The 'UUMSI' is a unique identifier that refers to the Universal Unique Mobile Subscriber Identifier. The 'iccid' is the integrated circuit card identifier, a unique serial number of the SIM card itself, while the 'eid' represents the eSIM identifier, which is used in newer devices that do not require a physical SIM card. The presence of both 'iccid' and 'eid' in the subscriber schema 700 suggests that the system is designed to support both traditional removable SIM cards and eSIMs. This dual support is cardinal for a SASE solution, as it allows flexibility in managing cellular connections for a variety of devices with different SIM technologies. The 'subscriber_imsi' and 'subscriber_imei' tables further emphasize the importance of the SIM card, as they link the subscriber's identity to the IMSI and IMEI, which are quintessential for the network to authenticate the device and grant access.

Moreover, the 'subscriber_apn' table's inclusion of the 'apn_ip_address' indicates that individual SIM type can be assigned a specific APN for connecting to the service provider's network with the correct settings for internet and other services. This is particularly exigent for SASE solutions, as the APN determines the IP address that the device will use, which in turn can affect the security policies applied to the traffic from that device. The subscriber schema 700 enables the SASE solution to provide a seamless and secure connection for a wide range of cellular devices, accommodating the evolving landscape of mobile technology.

Referring next to FIG. 8, an algorithmic representation 800 of the UUMSI for cellular security is shown. The Universal Unique Mobile Subscriber Identifier (UUMSI) is a proposed identifier format designed to enhance cellular security within a clientless SASE framework. The UUMSI schema is particularly relevant in the context of cellular networks where traditional security measures may not suffice due to the absence of clients on IoT devices. The UUMSI provides a unique, global, and consistent identifier for mobile subscribers across different device types, such as SIM, cSIM, and iSIM. The 'createUUMSI' function is the core of the UUMSI schema, which generates the UUMSI based on the device type and tenant information. For a SIM card, the international circuit card identifier (ICCID) is retrieved and normalized; for an eSIM, the embedded identifier (EID) is used; and for an iSIM, a unique identifier is obtained. If the device does not match any of these types, the UUMSI is set to null. After acquiring the tenant information, it is also normalized and incorporated into the UUMSI. The UUMSI schema incorporates tenant information into the identifier, which helps in maintaining a secure multi-tenant environment by preventing unauthorized access and ensuring that individual tenant's communications are properly encrypted and routed. This ensures that data and resources are correctly allocated, and that individual tenant's data remains isolated and secure.

The normalization process is carried out by the 'normalizedUUMSI' function, which ensures that each identifier is unique and not easily replicable. The 'padWithLeadingZeros' function ensures that the UUMSI has a consistent length, which is obligatory for database storage and processing. The implementation of this function will vary depending on the programming language used, but its purpose remains the same: to standardize the length of the identifier.

The schema's design allows for efficient management of encryption keys in a multi-tenant system, making it a suitable solution for the dynamic and flexible security requirements of modern cellular networks. As an example, the UUMSI schema provides handling of tenant-specific encryption by associating individual UUMSI with the appropriate key stored in a secure key management system. In a multi-tenant environment, where resources and services are shared among various users or entities, it is cardinal to maintain strict separation of individual tenant's data. This is achieved by assigning unique encryption keys to individual tenants, which are then used in conjunction with the UUMSI to provide an additional layer of security. The process begins with the generation of the UUMSI, which is based on device-specific identifiers. Once the UUMSI is created, it can be associated with tenant-specific encryption keys. These keys are used to encrypt and decrypt data transmitted to and from the cellular devices, ensuring that individual tenant's data remains secure and isolated from others.

Figure 9:
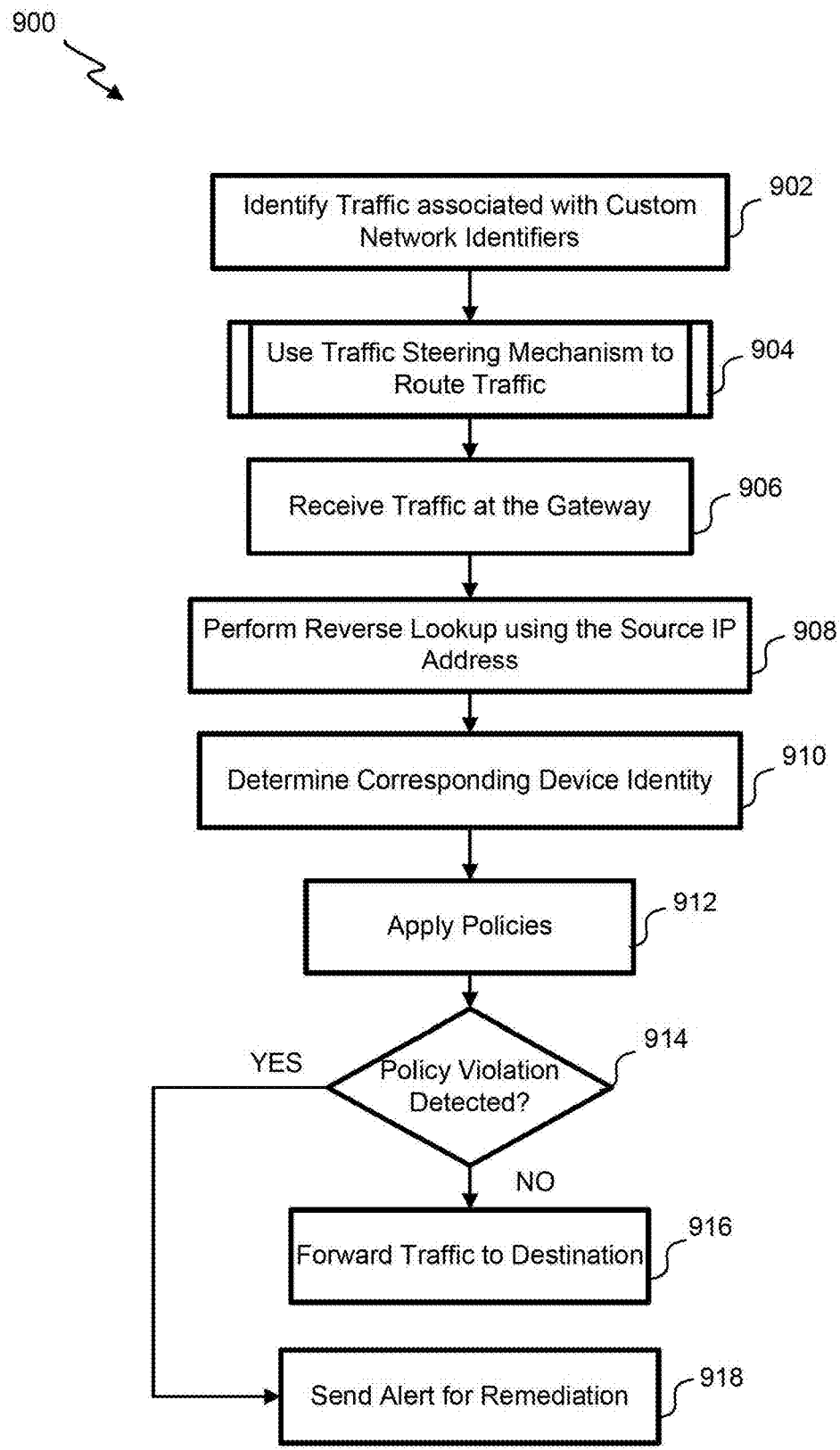
FIG. 9 illustrates a clientless security method for securing cellular devices across a cellular network in a cloud-based environment.

Referring next to FIG. 9, a clientless security method 900 for securing the cellular devices 108 across a cellular network in a cloud-based environment is shown. At block 902, the cellular network receives traffic from the cellular device 108 and identifies the traffic associated with custom network identifiers. At block 904, the traffic steering module 110 routes the traffic to secure gateways using the tunnels 116. The tunnels 116 of the clientless security system 100 are IPsec tunnels that are used to secure network communications. This provides a means to establish encrypted connections across public networks. Traffic incoming from different tenants remains separated in the tunnels 116.

At block 906, the clientless security system 100 receives traffic from the traffic steering module 110 at the gateway 104. The gateways 104 are responsible for tasks such as authentication, routing, and packet optimization, which are cardinal for the operation of 3G, 4G, and 5G networks. At block 908, the lookup module 304 at the gateway 104 performs a reverse lookup using the source IP addresses. The lookup module 304 also takes input from the Device-to-IP mapping database 302 to establish a correlation.

At block 910, the gateway 104 of the clientless security system 100 determines the device identity corresponding to a traffic instance in the cellular network. At block 912, the DLP block 308 loads policies from the policy database 306 and applies them to the traffic instance. The DLP block 308 then analyzes the traffic in comparison to the policies and detects any violation of the policy at block 914.

At block 914, if a policy violation is not detected, the clientless security system 100 forwards traffic to the destination. Otherwise, if a policy violation is detected, the alert generator 112 sends an alert to the tenant(s) 106 for further remediation of the violation. The remediation acts include blocking/restarting the subscriber, blocking/restarting the corresponding traffic, providing limited connectivity to the anomalous cellular device or tenant, or quarantining the malicious traffic instance.

Figure 10:
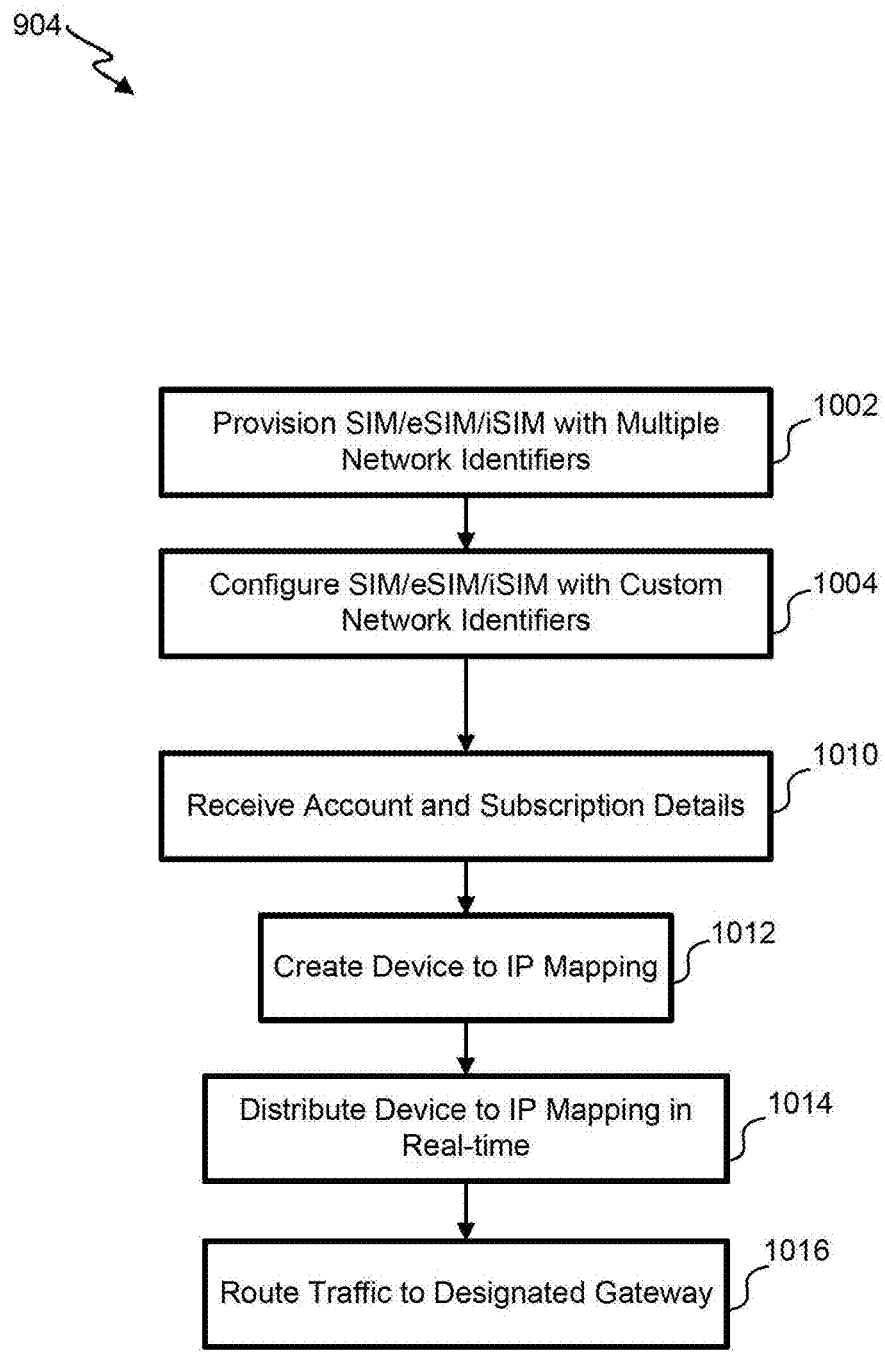
FIG. 10 illustrates a traffic steering mechanism for routing traffic at the clientless security system.

Referring next to FIG. 10, a traffic steering mechanism 904 for routing traffic at the clientless security system 100 is shown. The traffic steering mechanism 904 is carried out by the traffic steering module 110 of the clientless security system 100. When the IoT device 502 initiates a data session, the traffic is securely steered through the packet core network using the custom APN in 4G or DNN in 5G. For this purpose, the cellular network identifies the traffic associated with the custom APN or DNN and routes it to the designated SASE gateway using the intelligent traffic steering mechanism. The SASE gateway 514 receives the traffic, performs a reverse lookup using the source IP address to determine the corresponding device identity (UUMSI), and applies the appropriate security policies, access controls, and inline security functions (Firewall, ACLs, etc.) based on the device's identity and tenant-specific requirements. At block 1002, the connectivity management platform 202 provisions the SIM/eSIM/iSIM with multiple network identifiers (IMSIs) and configured with custom APN for 4G or custom DNN for 5G. The IoT device 502 authenticates with 4G/5G network 508 using the network identifier in the SIM and is in an active state with IPv4/IPv6 address assigned to the IoT device 502.

At block 1004, the connectivity management platform 202 coordinates with 4G/5G subscription management entity in the packet core 510 over Gx Interface or using REST API to get/assign static/dynamic IP assignment in subnet range specific to custom APN in 4G network or custom DNN in 5G network. At block 1010, the management plane 208 retrieves account and subscription details from the connectivity management platform 202.

At block 1012, the management plane 208 creates "device-to-IP mapping" using a unique Universal Unique Mobile Subscriber Identity (UUMSI) identifier as the primary key. At bock 1014, the management plane 208 distributes "device-to-IP" mapping to the relevant SASE gateways in real-time. These "device-to-IP mappings" are stored in the device-to-IP mappings database 302, which takes UUMSI as a central identifier and provides flexible device identity management, real-time Device-to-IP mapping, granular security policy definition, and scalable and efficient policy enforcement. Finally, at block 1016, the traffic steering module 110 routes the traffic to a designated gateway in the cellular network.

Figure 11:
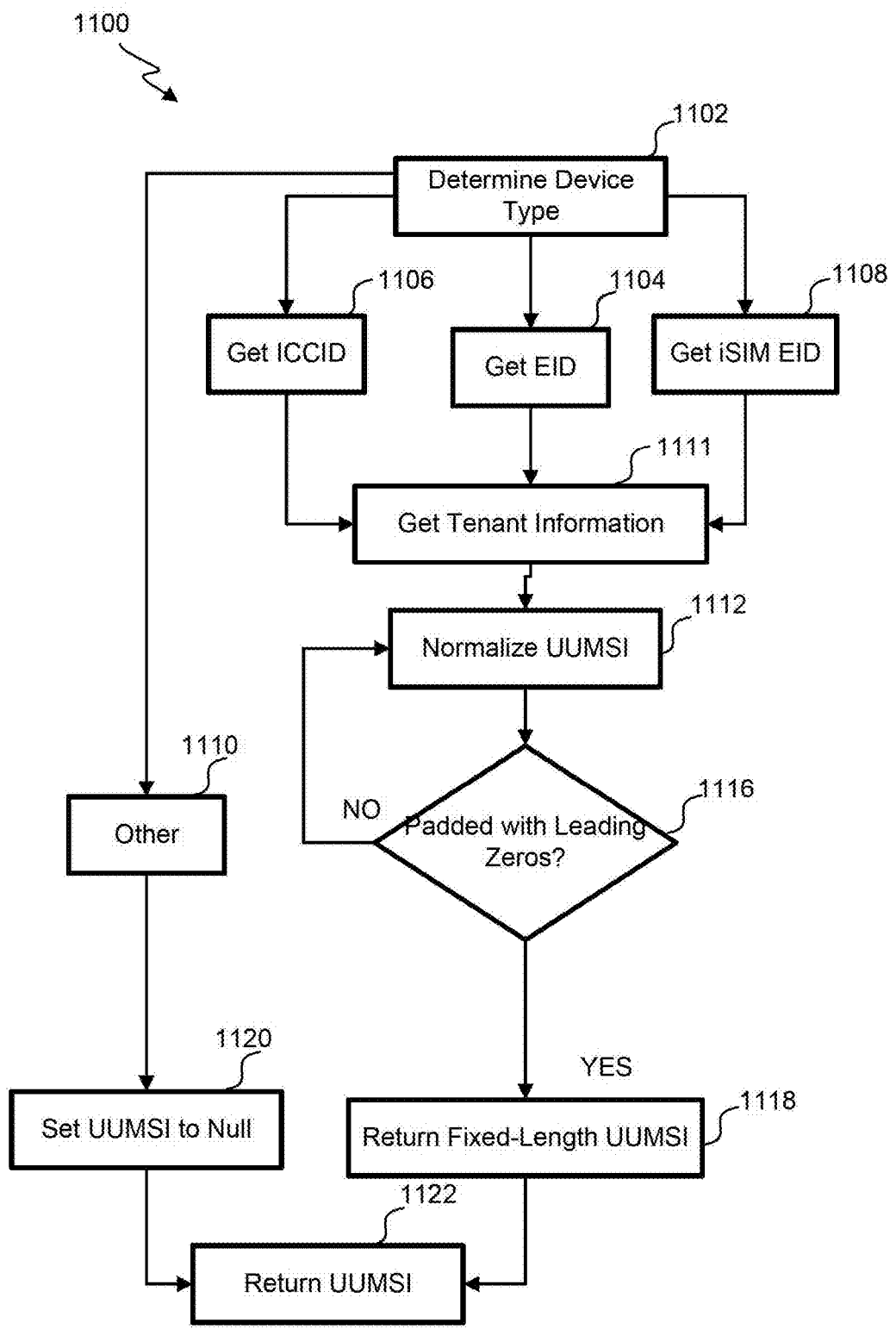
FIG. 11 illustrates a flowchart representation of a UUMSI for cellular security.

Referring next to FIG. 11, a flowchart representation 1100 of a UUMSI for cellular security is shown. The UUMSI addresses the limitations of traditional identifiers and provides a secure, scalable, and interoperable solution for device identification and access control in a clientless SASE environment. By leveraging UUMSI, the clientless security system 100 can effectively manage and secure the cellular devices 108, enforce granular security policies, and enhance the overall security posture of cellular deployments.

At block 1102, the UUMSI 210 block determines the type of the cellular device 108 as the UUMSI provides a unique, global, and consistent identifier for mobile subscribers across different device types, such as SIM, eSIM, and iSIM. At block 1104, the UUMSI 210 block retrieves the international circuit card identifier (ICCID) for a SIM card. At block 1106, the UUMSI 210 block retrieves the Embedded Identifier (EID) for an eSIM. At block 1108, the UUMSI 210 block retrieves the unique identifier for an iSIM.

If the device does not match any of these types at block 1110, the UUMSI is set to null at block 1120. At block 1111, the UUMSI 210 block gets information of the tenant(s) 106 at the cellular network that uses the device types mentioned above. This ensures that data and resources are correctly allocated, and that individual tenant's data remains isolated and secure.

At block 1112, the UUMSI is normalized, which ensures that each individual identifier is unique and not easily replicable. At block 1116, the UUMSI 210 block checks whether the UUMSI is padded with leading zeros or not. This is done to ensure that the UUMSI has a consistent length, which is obligatory for database storage and processing. The implementation of this function will vary depending on the programming language used, but its purpose remains the same: to standardize the length of the identifier.

If the UUMSI is not padded with leading zeros at block 1112, it is pushed back to the previous stage. Otherwise, if the UUMSI is padded with leading zeros, then a fixed-length UUMSI is returned at block 1118. At block 1112, the UUMSI 210 block returns a UUMSI for a device which is then used to provide a global secure clientless solution for the cellular devices 108.

Figure 12:
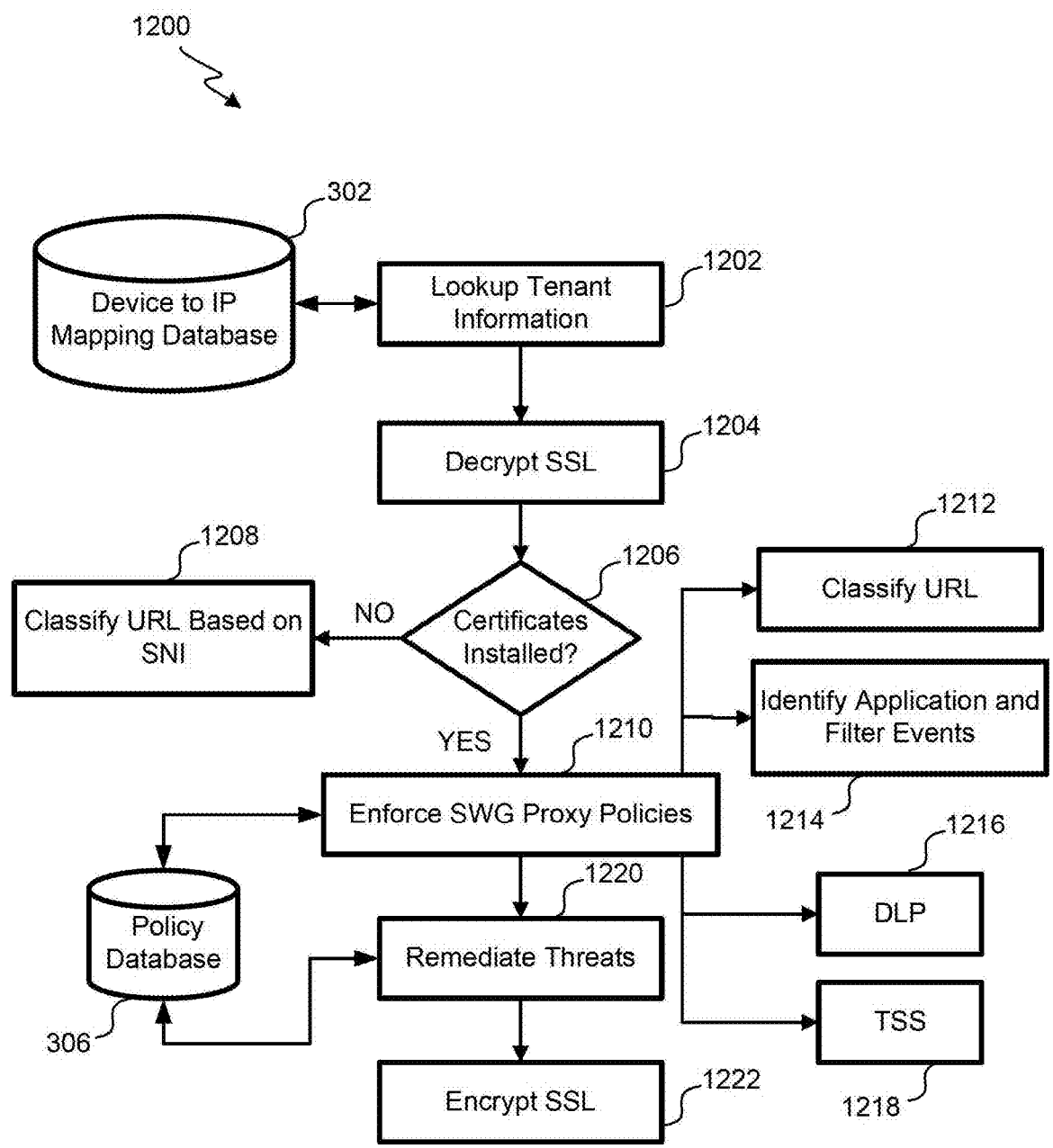
FIG. 12 illustrates a flowchart of an embodiment of the clientless security system for cellular devices with or without a certificate installed.

Referring next to FIG. 12, a flowchart of an embodiment of the clientless security system 100 for the cellular devices 108 with or without a certificate installed 1200 is shown. The certificate is an organization's package installed at the cellular device 108 to provide global secure SIM clientless SASE solution. The clientless security system 100 provides security to the cellular device 108 in both cases; where the cellular device 108 has a certificate installed or not for hypertext transfer protocol (HTTP) communication. For the cases where there is no way to install HTTPS trusted certificate, the clientless security system 100 can still do server name identification (SNI) based URL filtering to keep the cellular device 108 safe.

At block 1202, the lookup module 304 at the gateway 104 loads tenant information from the device-to-IP mapping database 302. At block 1204, the SWG 312 decrypts the secure sockets layer (SSL). The SSL decryption at block 1204 allows authorized users or organizations to convert the encrypted data back to its original, readable state. This allows network security professionals to monitor and protect against potential threats, as it enables them to inspect the contents of encrypted traffic.

At block 1206, the clientless security system 100 checks whether a certificate for HTTP communication is installed on the cellular device 108 or not. If certificates are not installed at the cellular device 108, then URL is classified based on SNI at block 1208. Classifying URLs for the cellular devices 108 based on Server Name Indication (SNI) is a technique used to identify and filter web traffic without the need for a certificate in HTTP communication. SNI is an extension of the TLS protocol that allows a client to specify the hostname it is trying to reach during the initial connection, which is particularly useful when a single IP address hosts multiple domains. This method is useful for the cellular devices 108 where installing certificates for HTTP communication may not be feasible. However, it's important to note that while SNI can facilitate domain name identification without a certificate, it does not encrypt the communication. For secure HTTPS communication, certificates are still required to prevent man-in-the-middle attacks and ensure data integrity. For cellular networks where resources are constrained, SNI-based URL classification optimizes web filtering and security measures without the overhead of certificate management.

On the other hand, if the certificates are installed at the cellular device 108, then the SWG 312 enforces proxy policies at block 1210. The SWG proxy policy enforcement includes classifying URLs at block 1212, Application identification and events filtering at block 1214, data loss prevention (DLP) by the DLP block 308 at block 1216, and target set selection (TSS) by the TSS block 314 at block 1218. To enforce policies, the relevant policies are extracted from the policy database and at block 1220, the remediation block 310 remediates the threat at the cellular network.

Finally, at block 1222, the SWG 312 encrypts the SSL at the cellular network. SSL encryption ensures that sensitive information can be transmitted securely, typically between a web server and a browser. When data is sent over an SSL connection, it is encrypted with a digital key, making it unreadable to anyone except the intended recipient who has the correct decryption key. This process is useful for protecting sensitive data such as credit card numbers, login credentials, and personal information.

The clientless security system 100 further provides security for the firewall side of the network 102. Both URL based and SNI based filtering, including other mechanisms, is done on the traffic at the firewall. SNI based URL filtering can also be performed on the traffic at the firewall that utilizes the SNI filed, which is part of the TLS handshake process, to determine the hostname of the server that the client is attempting to connect to. Firewalls like FortiGate, Palo Alto Networks, or an organization's personal firewall networks can be configured to inspect the SNI field and make allow or block decisions based on predefined policies.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process that is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine-readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read-only memory (ROM), random access memory (RAM), magnetic RAM, core memory, magnetic disk storage mediums, optical storage mediums, flash memory devices and/or other machine-readable mediums for storing information. The term "machine-readable medium" includes but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as a limitation on the scope of the disclosure.

We claim:

1. A clientless security system for securing a plurality of cellular devices across a cellular network in a cloud-based environment, the clientless security system comprises:
 a tenant of a plurality of tenants using a plurality of cellular networks, the tenant includes the plurality of cellular devices;
 a plurality of tunnels between a cellular device of the plurality of cellular devices and the cellular network, the plurality of tunnels is operable to:
  transmit traffic from the cellular device of the plurality of cellular devices at the cellular network; and
  identify traffic associated with a plurality of network identifiers;
 a traffic steering module to route traffic towards a gateway of a plurality of gateways in the cloud-based environment, wherein the traffic steering module is operable to:
  provision a Subscriber Identity Module (SIM) with the plurality of network identifiers;
  configure the SIM with a custom network identifier;
  create a device-to-IP mapping;
  distribute the device-to-IP mapping to the plurality of gateways in real-time; and
  route traffic to the gateway of the plurality of gateways using the custom network identifier;
 the plurality of gateways to apply a plurality of policies based on a device profile in the cloud-based environment, wherein the plurality of gateways is operable to:
  receive traffic from the traffic steering module at the cellular network;
  perform a reverse lookup for the cellular device of the plurality of cellular devices using a source IP address;
  determine a device identity corresponding to traffic from the cellular device of the plurality of cellular devices;
  apply the plurality of policies based on the device profile; and
  forward traffic to a destination in the cloud-based environment; and
 an alert generator to notify the tenant for a remediation in case of detection of violation of a policy of the plurality of policies.

2. The clientless security system of claim 1, wherein the plurality of cellular devices authenticates with the cellular network using a network identifier in the SIM and are in active state with IPv4/IPv6 addresses.

3. The clientless security system of claim 1, wherein the custom network identifier is used for traffic segregation in the cellular network and the custom network identifier is an APN for a 4G network and a DNN for a 5G network.

4. The clientless security system of claim 1, wherein the device-to-IP mapping is created using a universal unique mobile subscriber identity (UUMSI) identifier as a primary key.

5. The clientless security system of claim 1, wherein traffic at the cellular network, on a web and on a firewall side, is analyzed by a server name identification (SNI) based URL filtering method that provides security to the plurality of cellular devices.

6. The clientless security system of claim 1, wherein the device profile is created by analyzing the plurality of policies, traffic patterns, and device types associated with the plurality of tenants.

7. The clientless security system of claim 1, wherein the remediation in case of detection of violation of the policy of the plurality of policies includes:
blocking a corresponding traffic;
quarantining the cellular device of the plurality of cellular devices; and
allowing limited connectivity to the cellular device of the plurality of cellular devices.

8. A clientless security method for securing a plurality of cellular devices across a cellular network in a cloud-based environment, the clientless security method comprising:
transmitting traffic from a cellular device of the plurality of cellular devices at the cellular network;
identifying traffic associated with a plurality of network identifiers;
routing traffic towards a gateway of a plurality of gateways in the cloud-based environment using a traffic steering module, wherein the traffic steering module is operable to:
provisioning a Subscriber Identity Module (SIM) with the plurality of network identifiers;
configuring the SIM with a custom network identifier;
creating a device-to-IP mapping;
distributing the device-to-IP mapping to the plurality of gateways in real-time; and
routing traffic to the gateway of the plurality of gateways using the custom network identifier;
applying a plurality of policies based on a device profile in the cloud-based environment using the plurality of gateways, wherein the plurality of gateways is operable to:
receiving traffic from the traffic steering module at the cellular network;
performing a reverse lookup for the cellular device of the plurality of cellular devices using a source IP address;
determining a device identity corresponding to traffic from the cellular device of the plurality of cellular devices;
applying the plurality of policies based on the device profile; and
forwarding traffic to a destination in the cloud-based environment; and
notifying a tenant for a remediation in case of detection of violation of a policy of the plurality of policies.

9. The clientless security method of claim 8, wherein the plurality of cellular devices authenticates with the cellular network using a network identifier in the SIM and are in active state with IPv4/IPv6 addresses.

10. The clientless security method of claim 8, wherein the custom network identifier is used for traffic segregation in the cellular network and the custom network identifier is an APN for a 4G network and a DNN for a 5G network.

11. The clientless security method of claim 8, wherein the device-to-IP mapping is created using a universal unique mobile subscriber identity (UUMSI) identifier as a primary key.

12. The clientless security method of claim 8, wherein traffic at the cellular network, on a web and on a firewall side, is analyzed by a server name identification (SNI) based URL filtering method that provides security to the plurality of cellular devices.

13. The clientless security method of claim 8, wherein the device profile is created by analyzing the plurality of policies, traffic patterns, and device types associated with a plurality of tenants.

14. The clientless security method of claim 8, wherein the remediation in case of detection of violation of the policy of the plurality of policies further comprises:
blocking a corresponding traffic;
quarantining the cellular device of the plurality of cellular devices; and
allowing limited connectivity to the cellular device of the plurality of cellular devices.

15. A non-transitory computer-readable media having computer-executable instructions embodied thereon that, when executed by one or more processors, facilitate a clientless security method for securing a plurality of cellular devices across a cellular network in a cloud-based environment, the clientless security method comprising:
transmitting traffic from a cellular device of the plurality of cellular devices at the cellular network;
identifying traffic associated with a plurality of network identifiers;
routing traffic towards a gateway of a plurality of gateways in the cloud-based environment using a traffic steering module, wherein the traffic steering module is operable to:
provisioning a Subscriber Identity Module (SIM) with the plurality of network identifiers;
configuring the SIM with a custom network identifier;
creating a device-to-IP mapping;
distributing the device-to-IP mapping to the plurality of gateways in real-time; and
routing traffic to the gateway of the plurality of gateways using the custom network identifier;
applying a plurality of policies based on a device profile in the cloud-based environment using the plurality of gateways, wherein the plurality of gateways is operable to:
receiving traffic from the traffic steering module at the cellular network;
performing a reverse lookup for the cellular device of the plurality of cellular devices using a source IP address;
determining a device identity corresponding to traffic from the cellular device of the plurality of cellular devices;
applying the plurality of policies based on the device profile; and
forwarding traffic to a destination in the cloud-based environment; and notifying a tenant for a remediation in case of detection of violation of a policy of the plurality of policies.

16. The non-transitory computer-readable media of claim 15, wherein the plurality of cellular devices authenticates with the cellular network using a network identifier in a SIM and are in active state with IPv4/IPv6 addresses.

17. The non-transitory computer-readable media of claim 15, wherein the custom network identifier is used for traffic segregation in the cellular network and the custom network identifier is an APN for a 4G network and a DNN for a 5G network.

18. The non-transitory computer-readable media of claim 15, wherein the device-to-IP mapping is created using a universal unique mobile subscriber identity (UUMSI) identifier as a primary key.

19. The non-transitory computer-readable media of claim 15, wherein the device profile is created by analyzing the plurality of policies, traffic patterns, and device types associated with a plurality of tenants.

20. The non-transitory computer-readable media of claim 15, wherein the remediation in case of detection of violation of the policy of the plurality of policies further comprises:
blocking a corresponding traffic; quarantining the cellular device of the plurality of cellular devices; and
allowing limited connectivity to the cellular device of the plurality of cellular devices.

* * * * *